United States Patent
Salisbury et al.

(10) Patent No.: US 11,455,742 B2
(45) Date of Patent: Sep. 27, 2022

(54) IMAGING SYSTEMS INCLUDING REAL-TIME TARGET-ACQUISITION AND TRIANGULATION FEATURES AND HUMAN-MACHINE INTERFACES THEREFOR

(71) Applicant: Thermoteknix Systems Limited, Cambridge (GB)

(72) Inventors: Richard Sydney Salisbury, Cambridge (GB); Mark Gatenby, Huntingdon (GB)

(73) Assignee: Thermoteknix Systems Ltd., Cambridge (GB)

( * ) Notice: Subject to any disclaimer, the term of this patent is extended or adjusted under 35 U.S.C. 154(b) by 168 days.

(21) Appl. No.: 16/850,137

(22) Filed: Apr. 16, 2020

(65) Prior Publication Data

US 2020/0334848 A1 Oct. 22, 2020

Related U.S. Application Data

(60) Provisional application No. 62/836,274, filed on Apr. 19, 2019.

(51) Int. Cl.
*G06T 7/70* (2017.01)
*G06T 7/20* (2017.01)

(52) U.S. Cl.
CPC .............. *G06T 7/70* (2017.01); *G06T 7/20* (2013.01); *G06T 2200/24* (2013.01); *G06T 2207/10028* (2013.01); *G06T 2207/10048* (2013.01)

(58) Field of Classification Search
CPC ...... F41G 1/00; F41G 3/02; F41G 3/04; F41G 3/06; F41G 9/00; G02B 23/18;
(Continued)

(56) References Cited

U.S. PATENT DOCUMENTS

2010/0182426 A1* 7/2010 Perruchot ............... F41G 3/02
348/135
2012/0200917 A1* 8/2012 Rivkin ................ G02B 23/125
359/481
(Continued)

FOREIGN PATENT DOCUMENTS

EP 3396323 A1 10/2018

*Primary Examiner* — Tat C Chio
(74) *Attorney, Agent, or Firm* — Downs Rachlin Martin PLLC

(57) ABSTRACT

Imaging systems that automatically calculate, in real time, relative locations of acquired targets relative to datum targets. In some embodiments, an imaging system of this disclosure can be instantiated as a handheld imaging device having a live-view imaging system or a thermal imaging system, or both. Some embodiments include a ranging system that fires upon the release of a hard button to minimize movement of the imaging system during target acquisition. Some embodiments include speed estimating and/or time of arrival estimating features. Some embodiments can communicate with an external device, such as a central controller device. A central controller device of this disclosure may include triangulation, speed estimating, and/ or time of arrival estimating features. Some embodiments of a central control device may allow users to set up and make mission assignments. Some embodiments allow sharing of data among devices, in some cases only on a mission-by-mission basis.

37 Claims, 10 Drawing Sheets

(58) Field of Classification Search
CPC ....... G06T 2200/24; G06T 2207/10028; G06T 2207/10048; G06T 7/20; G06T 7/70
See application file for complete search history.

(56) References Cited

U.S. PATENT DOCUMENTS

| | | | |
|---|---|---|---|
| 2012/0200918 A1* | 8/2012 | Rivkin ............... | G02B 27/0176 359/481 |
| 2014/0210950 A1* | 7/2014 | Atanassov ................ | G06T 7/12 348/47 |
| 2015/0355328 A1* | 12/2015 | Maryfield ............... | G01S 7/497 356/8 |
| 2016/0189361 A1* | 6/2016 | Lo ........................ | H04N 13/271 382/106 |
| 2017/0134631 A1* | 5/2017 | Zhao .................... | G05D 1/0094 |

* cited by examiner

US 11,455,742 B2

IMAGING SYSTEMS INCLUDING REAL-TIME TARGET-ACQUISITION AND TRIANGULATION FEATURES AND HUMAN-MACHINE INTERFACES THEREFOR

RELATED APPLICATION DATA

This application claims the benefit of priority of U.S. Provisional Patent Application Ser. No. 62/836,274, filed Apr. 19, 2019, and titled "TARGET ACQUISITION AND TRIANGULATION FEATURES AND USER INTERFACE FOR IMAGING SYSTEM AND IMAGING SYSTEMS INCORPORATING THE SAME," which is incorporated by reference herein in its entirety.

FIELD OF THE INVENTION

The present invention generally relates to the field of imaging systems. In particular, the present invention is directed to imaging systems including real-time target-acquisition and triangulation features and human-machine interfaces therefor.

BACKGROUND

Some conventional imaging systems include position sensors for determining the current position of the imaging system. Some conventional imaging systems further including distance and angle measurement sensors for determining a distance and angles from the imaging system to a target. The position of the target can be determined using data from these sensors.

SUMMARY OF THE DISCLOSURE

In an implementation, the present disclosure is directed to a system that includes an imaging system that includes a live-view imaging system configured to display a live-view image of a scene to a user; a target-acquisition system configured so that the user can acquire a spatial location of a first target in the scene while viewing the live-view image; a triangulation system configured to allow the user to make the first target a triangulation target; allow the user to identify a datum target having a spatial location; and calculate a difference between the spatial locations of the datum target and the triangulation target; and a display system configured to display the difference in real time.

BRIEF DESCRIPTION OF THE DRAWINGS

For the purpose of illustrating the inventions, the drawings show aspects of one or more embodiments of the inventions. However, it should be understood that the present invention is not limited to the precise arrangements and instrumentalities shown in the drawings, wherein.

DETAILED DESCRIPTION

Figure 1:
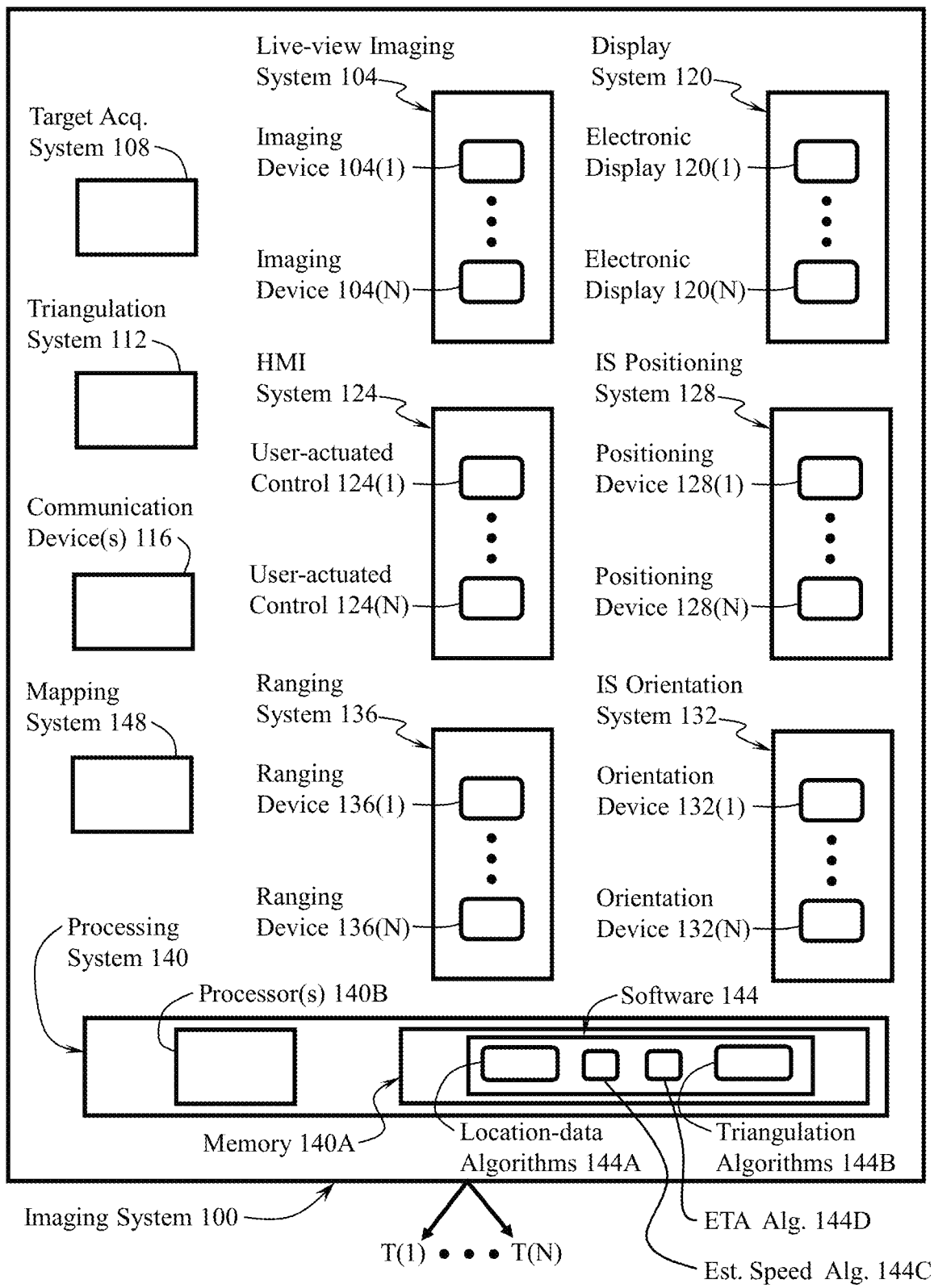
FIG. 1 is a high-level block diagram of an example imaging system made in accordance with the present disclosure.

In some aspects, the present disclosure is directed to imaging systems that include target-acquisition and triangulation features that allow users to, among other things, acquire target-location information quickly and in real time, and to triangulate, in real time, between a selected datum target and an acquired target. These features are useful in a variety of applications, such as "fall-of-shot" applications in the field of ranged weapons, for example, artillery, wherein munitions are launched from relatively large distances away from the intended targets and forward observers are needed to determine where the munitions hit to allow the artillery team(s) to make necessary aim adjustments needed to hit the intended targets. In some embodiments, an imaging system of the present disclosure may be embodied in a handheld imaging device that may also be mountable to a tripod or other support to improve physical stability and, therefore, the accuracy of the information that the handheld imaging device acquires during use. In some embodiments, an imaging system of the present disclosure may be embodied in a portable system that may include two or more components that communicate with one another either wirelessly or in a wired manner, or both. In some embodiments, the imaging system may include a mapping system that maps data from the imaging system, such as imaging system location data and/or orientation data, datum-target location data, target data for one or more acquired targets, and triangulation data, such as relative-location data for one or more triangulation targets relative to a datum target, among other data, to an electronic geographical map so as to present the data visually in conjunction with displaying the map. Examples of such imaging systems are described below.

In some aspects, the present disclosure is directed to human-machine interfaces (HMIs) for target-acquisition and/or triangulation systems. In some embodiments, HMIs of the present disclosure include graphical user interfaces (GUIs) that allow users to quickly and efficiently acquire targets, establish datum targets, establish triangulation targets, and initiate triangulation calculations, and to easily view data and other information regarding these things. In some embodiments, HMIs of the present disclosure include user-actuated controls, such as hard buttons and/or soft buttons, among others, that allow users to quickly and efficiently control imaging systems of this disclosure to perform, for example, the target-acquisition, triangulation, and/or mapping functionalities that may be embodied in such imaging systems.

In some aspects, the present disclosure is directed to methods that can be, for example, performed by one or more of the imaging systems of the present disclosure. In some embodiments, the methods include methods of acquiring target location data and methods of displaying acquired target location data. In some embodiments, the methods include methods of identifying one or more datum targets for triangulation, methods of identifying one or more triangulation targets, methods of initiating triangulation, and methods of displaying triangulation data. These and other methods are described below.

The foregoing and other features, aspects, functionalities, and embodiments are illustrated below in detail. It is noted that in the context of this disclosure and the appended claims, the term "real time" and like terms shall mean that the pertinent task, process, etc., occurs virtually instantaneously, accounting for delays that are naturally inherent in signal transmission, processing of software code, sensor operation (e.g., range finders) and/or operation of computer hardware, including memory operations, among others that take a non-zero, but typically relatively small, amount of time to perform. Those skilled in the art of imaging systems, range finders, computing systems, etc., understand the meaning of "real time" and like terms in relevant application fields.

Example Imaging System

Referring now to the drawings, FIG. 1 illustrates an example imaging system 100 that can include any one or more of the features, functionalities, and aspects described above. In this example, the imaging system 100 includes a live-view imaging system 104, a target-acquisition system 108, a triangulation system 112, one or more communication devices 116, a display system 120, an HMI system 124, an imaging-system (IS) positioning system 128, an IS orientation system 132, a ranging system 136, and a processing system 140. It is noted that the term "system" as used in this disclosure and in the appended claims does not necessarily denote that the system is self-contained or is otherwise separate and distinct from other components and/or other systems described herein. Rather, the term "system" is used to refer to the collection of hardware (e.g., buttons, processor(s), memory, display(s), display driver(s), range finders, location and orientation devices, etc.) and/or software (e.g., triangulation algorithms, algorithms for receiving and interpreting user-control actuations, algorithms for displaying information to a user, etc.) that provide the functionality of the particular system at issue. At this level, a particular system can overlap with one or more of the other systems. As an example and as described below in more detail, a particular embodiment of the triangulation system 112 will typically involve receiving input and displaying information via the HMI system 124, which can involve the display system 120 and the processing system 140. Such an embodiment will also require the processing system 140 to perform triangulation algorithms 144B) and other algorithms, such as location-data algorithms 144A. Consequently, unless otherwise noted, the term "system" should be construed in terms of overall functionality of the named system.

The live-view imaging system 104 may include any one or more imaging devices 104(1) to 104(N) of any desirable type(s) that provide one or more corresponding live-view images of a scene at which the imaging device(s) is/are aimed. Examples of imaging-device types include, but are not limited to visible-light imaging devices (e.g., a clear optical monocular or binocular, a visible light camera (e.g., charge-coupled device (CCD) camera), etc.), and an infrared (IR) imaging device (e.g., thermal camera (e.g., short-wave infrared (SWIR) camera)), among others. In some embodiments that include imaging devices 104(1) to 104(N) of differing types, the imaging system 104 may be configured to be switchable between the differing types and/or configured to provide a composite image composed of images from the differing types. For example, if the live-view imaging system 104 has a visible light camera and a thermal camera, the live-view imaging system may be configured to allow a user to view a visible-light image by itself, a thermal image by itself, and a composite image of the visible-light image and the thermal image. If a composite image is provided, it may be, for example, of the superposed type in which the two images are aligned and superposed with one another or of a windowed type in which the two images are provided in separate windows. In the windowed type, the two windows may be positioned, for example, side-by-side or in an overlaid manner.

The live-view imaging system 104 may be controlled via the HMI system 124. For example, the HMI system 124 may include various user-actuated controls 124(1) to 124(N), one or more of which control the operation of the live-view imaging system. For example, one or more of the user-controls 124(1) to 124(N) and corresponding aspects of the processing system 140, may be configured to allow the user to use such control(s) to switch the imaging system 104 between imaging modes and/or make one or more adjustments to the image(s) the user is viewing, such as brightness, contrast, saturation, etc.

It is noted that "N" as used in any element identifier herein is an integer that represents the last in a series of the corresponding element. The integer N can be different for different elements. For example, N may be 2 for the imaging device(s), i.e., imaging devices 104(1) to 104(2), while N may be 10 for user-actuated controls, i.e., user actuated controls 124(1) to 124(10). In some cases N can be 1, such that there is only a single one of the corresponding element. For example, if N is 1 for the imaging device(s), there is only a single imaging device 104(1).

The live-view system 104 may display electronic images (not shown) via the display system 120, which may include one or more electronic displays 120(1) to 120(N) and any supporting hardware and/or software (not shown), such as one or more graphics processors and display-driver software, among other things. Each electronic display 120(1) to 120(N) may be implemented in any suitable display technology, such as liquid crystal display (LCD) technology or light-emitting diode (LED) technology (e.g., inorganic or organic LED technology), among others. In some embodiments, at least one of the one or more electronic displays 120(1) to 120(N) may be of the viewfinder type, for example, when the imaging system 100 is implemented as a handheld imaging device (see, e.g., the handheld imaging device 200 of FIGS. 2A to 2C). In some embodiments, at least one of the one or more electronic displays 120(1) to 120(N) may be of another type, such as a device-mounted external display or a display that is part of a device separate and distinct from a device incorporating the relevant imaging device(s) 104(1) to 104(N). In some embodiments, the live-view imaging system 104 and/or the display system 120 may be configured to allow a user to record video and/or still images captured by one or more of the imaging devices 120(1) to 120(N).

The target-acquisition system 108 is configured to allow one or more users to cause the imaging system 100 to determine location data for each of one or more targets, such as targets T(1) to T(N) located externally to the imaging system. In some embodiments, location data includes geographic coordinate data (e.g., latitude, longitude, elevation). In some embodiments, location data includes local-coordinate data (e.g., X, Y, Z coordinates relative to a local datum). Fundamentally, there is no limitation on the location data, as long as it uniquely defines the location of a target in a manner that is useful to the application of the imaging system 100. The target acquisition system 108 may be configured to determine location data for a target T(1) to T(N) based on the target-acquisition system knowing location data and orientation data for the imaging system 100 or pertinent component(s) thereof, such as a receiver (not shown) of the ranging system 136, among others.

The target-acquisition system 108 may obtain such location data from the IS positioning system 128 via one or more positioning devices 128(1) to 128(N). When an application at issue uses geographic location data, at least one of the one or more positioning devices 128(1) to 128(N) may include a global-positioning-system (GPS) device, such as a GPS chip, GPS chipset, GPS module, etc. When an application at issue uses another type of coordinate system for location data, at least one of the one or more positioning devices 128(1) to 128(N) may include another type of positioning system device, such as a local-positioning-system (LPS) device, such as an LPS chip, LPS chipset, LPS module, etc. In some embodiments, the target-acquisition system 128 includes multiple types of positioning devices, such as both GPS and LPS devices, and may be configured to automatically or manually switch between the types depending on the situation at hand.

The target-acquisition system 108 may obtain orientation data concerning the imaging system 100 from the IS orientation system 132. In one example, includes one or more orientation devices 132(1) to 132(N), such as a digital magnetic compass, an inclinometer, and/or one or more multi-axis accelerometers, among others.

In some embodiments, the target-acquisition system 108 utilizes the ranging system 136 to acquire distance data regarding the physical distance between each target T(1) to T(N) and the imaging system 100. The ranging system 136 may include one or more ranging devices 136(1) to 136(N), such as a laser range finder and an optical range finder, among others, and any combination thereof. Various types of ranging devices 136(1) to 136(N), including laser range finders and optical range finders, are known in the art and can be adapted for use in an imaging system of the present disclosure, such as imaging system 100 of FIG. 1. Those skilled in the art will readily understand how to configure these and other types of ranging devices such that it is not necessary to describe particular ranging devices in more detail herein for such skilled artisans to practice the present inventions to their fullest scope.

The ranging system 136 may be configured to obtain distance data in any one or more of a variety of ways. For example, the ranging system 136 may be controlled via a single button, which may be one of the user-actuated controls 124(1) to 124(N) of the HMI system 124. In such an embodiment, a press of the button may activate the ranging system 136 (e.g., one of the ranging devices 136(1) to 136(N)), readying it to acquire distance data. Once the user has properly aimed the active ranging device(s) 136(1) to 136(N) while continuing to hold the button after the activating press, the user then releases the button to cause the active ranging device(s) to "fire", i.e., acquire the distance data. In the context of a laser range finder, the release of the button causes the laser range finder to fire the laser to obtain a distance measurement. In addition to firing the one or more active ranging devices 136(1) to 136(N), the user's release of the button also acquires current location data and current orientation data for the imaging system 100 from, respectively, the IS positioning system 128 and the IS orientation system 132. Having the all of the distance data, position data, and orientation data at the instant of firing the active ranging device(s) 136(1) to 136(N) allows the target-acquisition system 108 to calculate the location data for the relevant one of the targets T(1) to T(N). The calculations necessary for determining the location data is performed by one or more location-data algorithms 144A that is part of software 144 of the processing system 140. When the target-acquisition system 108 has determined the location data for the relevant target T(1) to T(N), the target-acquisition system and the imaging system 100 may be said to have "acquired" the target. In some embodiments, the release of the button may also cause the imaging system 100 (e.g., the display system 120) to acquire a still image at the time of target acquisition and/or deactivate the ranging device(s) 136(1) to 136(N).

Figure 2A:
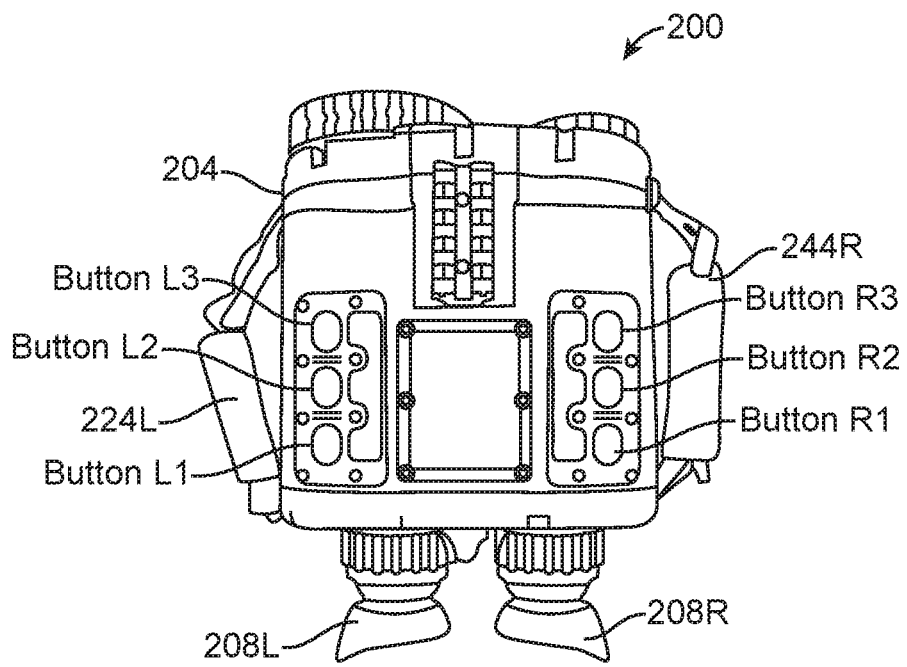
FIG. 2A is a plan view of an example handheld imaging device embodying aspects of the example imaging system of FIG. 1.
Figure 2B:
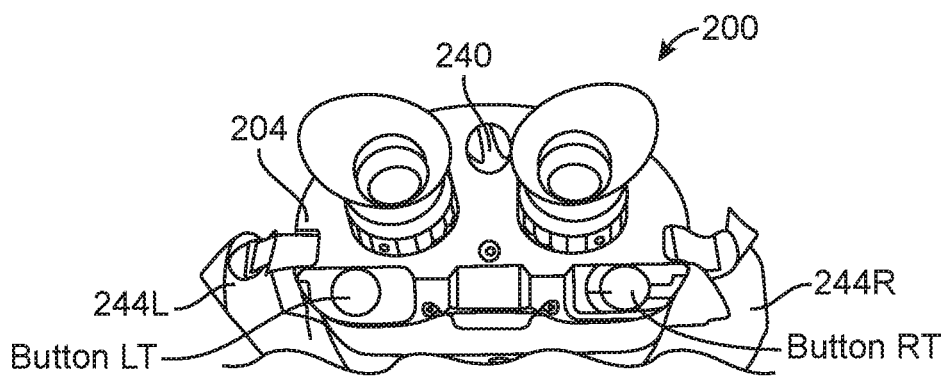
FIG. 2B is an elevational view of the user-facing end of the handheld imaging device of FIG. 2A.
Figure 2C:
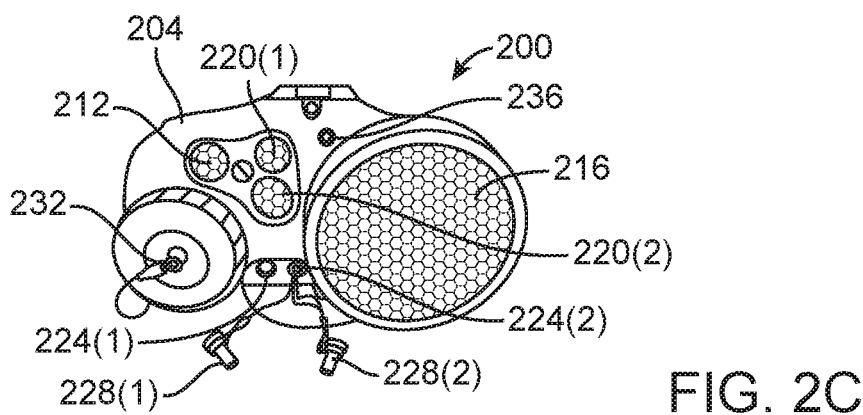
FIG. 2C is an elevational view of the scene-facing end of the handheld imaging device of FIGS. 2A and 2B.

The foregoing single-button operation of the target-acquisition system 108 can be particularly useful for handheld embodiments of the imaging system 100, such as in the example handheld imaging device 200 of FIGS. 2A to 2C. As many photographers that use handheld cameras having electromechanical or mechanical shutter-release buttons can attest, this is so because the physical act of releasing a suitably designed button can be far less destabilizing to the handheld imaging device than the depressing of that same button. When a user can hold the handheld imaging device more stably during the firing of the ranging device(s) 136(1) to 136(N), the accuracy of the image-acquisition system 108 is increased. This is especially true when acquiring distance data for targets T(1) to T(N) that are relatively far away from the imaging system 100, since even small angular (orientation) deviations cause during a button press can translate into relatively large elevational and/or lateral displacement of the line of sight of the ranging device(s) 136(1) to 136(N) at the location of the desired target T(1) to T(N). For example, the displacement of the line of sight at a distance of 2 miles for a disturbance angle of 0.01 degree of the handheld imaging device is greater than 22 feet. The activation upon depression of the button can be particularly beneficial in battery-powered versions of the imaging system 100 to minimize drain on the battery (not shown).

As mentioned above, other ways of activating and/or firing one or more of the ranging devices 136(1) to 136(N) can be implemented, including firing upon the pressing of a hard or soft button and activating upon pressing of the same or different button or actuating a switch-type control, among others. Those skilled in the art will understand that there are many ways of activating, firing, and deactivating any of the ranging devices 136(1) to 136(N).

The imaging system may be configured to store a variety of data in response to the firing of the ranging device(s) 136(1) to 136(N) to acquire one of the targets T(1) to T(N). For example, the target-acquisition system 108 may store, in a suitable type of memory 140A of the processing system 140, the location and orientation data (not illustrated) for the imaging system 100, the location data for the acquired target T(1) to T(N), the distance data and/or inclination/declination data to the acquired target, and one or more images of the scene containing the acquired target, among other things. Such data may be stored in any suitable format and any suitable type of data structure (not shown) and may include an acquired-target identifier (not shown) to uniquely identify the acquired target for future use and/or reference.

The imaging system 100 may also or alternatively be configured to display various data regarding the acquired target T(1) to T(N) via the display system 120. For example, the imaging system 100 may be configured so that the display system 120 displays, in real time and without further input from a user, location data and/or inclination/declination data for the acquired target T(1) to T(N) on one or more of the display devices 120(1) to 120(N), perhaps along with the acquired-target identifier. The imaging system 100 may optionally also be configured to display various pieces of data/information associated with the acquired target T(1) to T(N), such as one or more captured images and location/declination/inclination data for targets that the imaging system acquired prior to the most-current acquired target. A variety of other storage and display options for acquired-target data and information are possible.

The triangulation system 112 allows a user to determine, for example, a relative location of a desired acquired target, such as any one of the targets T(1) to T(N), relative to a selected datum target, for example, any one of the targets T(1) to T(N), by calculating the relative location. For convenience, the acquired target T(1) to T(N) for which a relative location is determined by the imaging system 100 is referred to as the "triangulated target". The triangulation system 112 may be configured to calculate the relative location, for example, via one or more suitable triangulation algorithms 144B of software 144, and to express this relative location in any suitable set of coordinates, such as spherical coordinates in which the datum target is located at the geometric center of a sphere. Using such a spherical coordinate system, the relative location may be expressed as a distance from the datum target to the triangulated target T(1) to T(N), a horizontal angle (e.g., relative to magnetic North or true North or other horizontal-angle datum), and a vertical angle (e.g., relative to a horizontal plane extending through the geometric center of the sphere, perhaps expressed as an inclination or declination, depending on the relative elevations between the datum target and the desired acquired target).

The triangulation system 112 may be configured to calculate additional information as desired. For example, the triangulation system 112 may be configured to calculate an apparent speed of a moving target, such as one of targets T(1) to T(N). Estimated-speed calculations may be made using a suitable estimated-speed algorithm 144C stored in memory 140A. In an embodiment of the imaging system 100 configured to calculate an apparent speed of a moving target, the triangulation system 112 may include a speed-calculation mode that a user can select via one or more of the user-actuated controls 120(1) to 120(N) of the HMI system 120. When the triangulation system 112 is in the speed-calculation mode, it assumes that each time the user is acquiring a target, such as one of the targets T(1) to T(N), that acquired target is the same target. Assuming that such target is moving, it will be in different locations at differing times. Thus, the triangulation systems 112, for example, via the triangulation algorithms 144B, can use the time difference between successive acquisitions of that target in conjunction with corresponding relative location data for the successive acquisitions to calculate an apparent speed.

It is noted that the apparent speed assumes a constant speed; it does not account for any accelerating or decelerating that may be occurring between the successive target acquisitions. However, the triangulation system 112 can be further configured to allow the user to continue to cause the imaging system 100 to make additional acquisitions of the same target, for example, by allowing the user to set the imaging device to a continual-acquisition mode, which may be a sub-mode of the speed-calculation mode. In an example, when the imaging system 100 is in the continual-acquisition mode, with each additional acquisition of the moving target after the first two, the triangulation system 112 may calculate an apparent speed between each adjacent pair of successive acquisitions as well as an apparent acceleration/deceleration relative to the first acquisition of the moving target after the imaging system 100 entered either the speed-calculation mode or continual-acquisition mode. Those skilled in the art will readily understand how to configured the triangulation algorithms 144B to perform the apparent speed and apparent acceleration using the relative location information and acquisition time data that the imaging system 100 generates in response to a user using the target-acquisition system 108 and the triangulation system 112.

As another example, the triangulation system 112 may be configured to calculate an estimated time of arrival (ETA) for a first target arriving at a second target, wherein at least one of the first and second targets is moving relative to the other. ETA calculations may be made using a suitable ETA algorithm 144D stored in memory 140A. In some embodiments, the imaging system 100 may be provided with an ETA mode that allows a user to acquire the first and second targets and identify that the triangulation system 112 is to use the first and second targets for determining an ETA. Such an ETA mode may be embodied in the imaging system 100 in any of a variety of ways. For example, the ETA mode may be provided as a standalone mode relative to any speed-calculation mode, such as described above. In an embodiment, a standalone ETA mode may be configured for use with one moving target and one stationary target and so that the imaging system 100 requires three acquisitions to make an ETA calculation. In this example, the first target acquisition is of the moving target at a first location and a first time, the second target acquisition is of the moving target at a second location and a second time, and the third target acquisition is of the stationary target. With the apparent speed, direction, and location information for the moving target and the location information of the stationary target, the triangulation system 112 can calculate an ETA for the moving target to arrive at the stationary target. In some variations, a standalone ETA mode may allow the user to make more than two acquisitions of the moving target before acquiring the stationary target. In some variations, a standalone ETA mode may require that the user acquire the stationary target before acquiring the moving target multiple times. In some embodiments, the imaging system 100 may allow a user to select a previously acquired target T(1) to T(N) as the stationary target. Such selection may be enabled in any suitable manner, such as via a list of previously acquired targets as described above in connection with target identification for relative location calculations.

An ETA mode may alternatively or also be a sub-mode of the speed-calculation mode. For example, the imaging system 100 may be configured so that, once a user has caused the imaging system 100 to calculate an apparent speed and/or an apparent acceleration for a moving (first) target as described above, the user can identify a second target, which may be a stationary or moving target. In some embodiments, imaging system 100 can be configured to allow the user to identify the second target in any suitable manner, such as via a new acquisition of a desired target T(1) to T(N) or by user selection from a list of previously acquired targets, among others.

The imaging system 100 may be configured to store a variety of data in conjunction with performing triangulation calculations. For example, the target-acquisition system 108 may store, in a suitable type of the memory 140A of the processing system 140, the relative location data for the triangulated target T(1) to T(N) relative to the designated datum target (e.g., another of the targets T(1) to T(N)), the distance data and/or inclination/declination data from the imaging system 100 to the triangulated target, a speed, direction of travel, and/or acceleration of a moving target, an identification for each of the triangulated target and the datum target, and one or more images of the scene containing the triangulated target and/or datum target, among other things. Such data may be stored in any suitable format and any suitable type of data structure (not shown) and may include a triangulation identifier (not shown) to uniquely identify the data associated with the particular triangulation calculation at issue.

Figure 6:
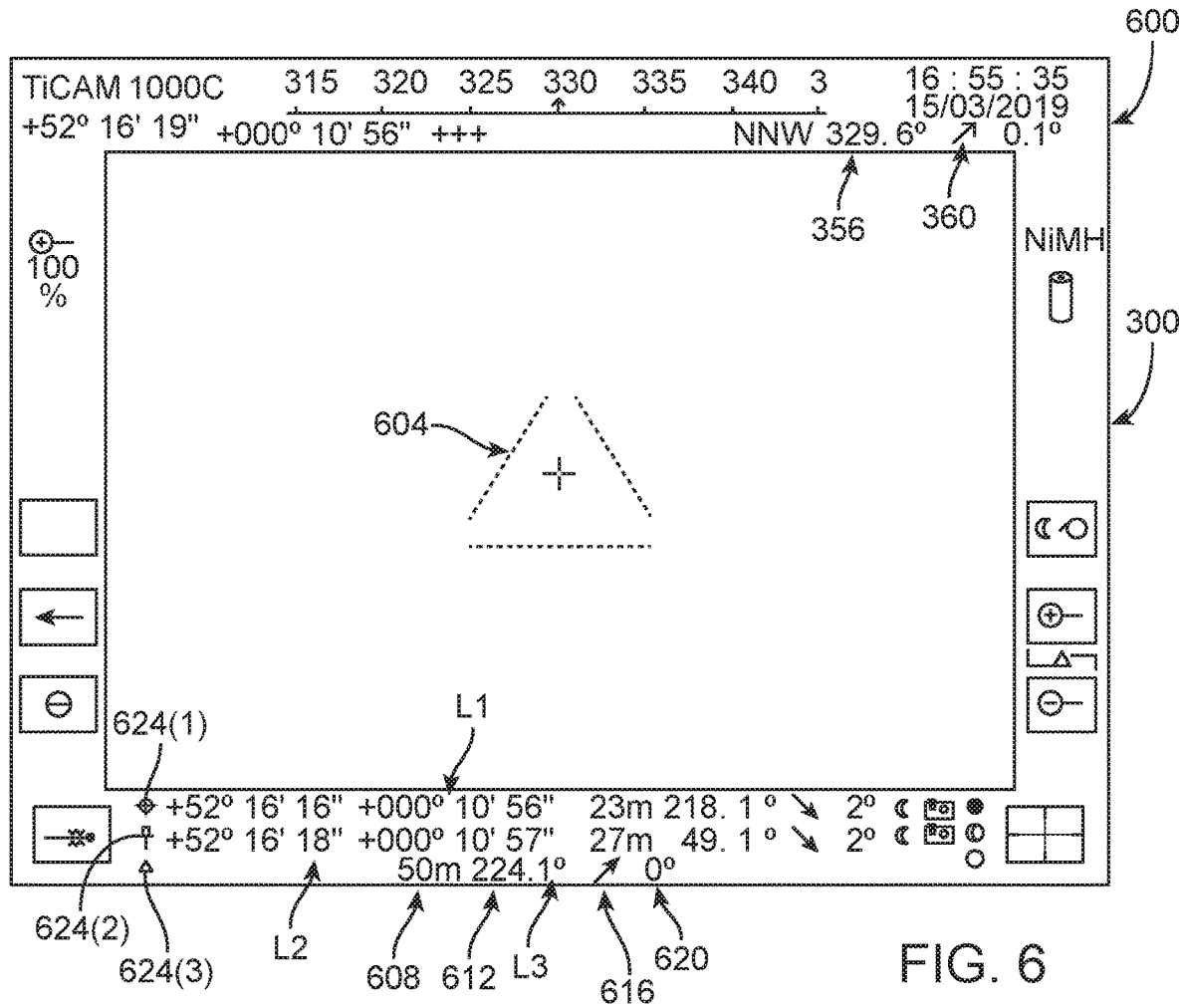
FIG. 6 is screenshot of the example GUI of FIG. 3 displayed on the internal viewfinder display of the handheld imaging device of FIGS. 2A to 2C, showing the GUI when the handheld imaging device in a triangulation mode.

The imaging system 100 may also or alternatively be configured to display various data associated with the triangulation calculations via the display system 120. For example, the imaging system 100 may be configured so that the display system 120 displays, in real time and without further input from a user, relative location data for the triangulated target T(1) to T(N), a speed, direction of travel, and/or acceleration of a moving target, and one or more visual indicators or other identifiers indicating/identifying the triangulated target and the data, on one or more of the display devices 120(1) to 120(N), perhaps along with the triangulation identifier that identifies the particular triangulation results at issue. A variety of other storage and display options for acquired-target data and information are possible. An example screenshot of screen that the display system 120 may generate for displaying data associated with a triangulated target is shown in FIG. 6 and described below.

The imaging system 100 may be configured to allow a user to control the triangulation system 112 in any one or more of a variety of ways. In one example, the imaging system 100 may be configured to operate in a rolling-datum mode in which the triangulation system 112 calculates a relative location between a "last-acquired" target, which becomes the datum target, and a "current-acquired" target, which becomes the triangulation target. In this manner, with each new acquisition of a target, that newly acquired target becomes the current triangulation target and the immediately last acquired target becomes the datum target. In this example, the last-acquire target is the acquired target T(1) to T(N) that the imaging system 100 acquired immediately before a user performs one or more operations to acquire a next acquired target, which becomes the "current-acquired" target. In this example, the triangulation system 112 is configured to continually designate the last-acquired target as the datum target should the user decide to acquire another target, here, the current-acquired target. In some embodiments, as soon as the user acquires a current-acquired target, the triangulation system 112 may be configured to automatically designate the current-acquired target as the triangulated target and automatically calculate the relative location of the triangulated target (i.e., current-acquired target) relative to the datum target (i.e., last-acquired target). In embodiments having such an automatic rolling-datum mode, the triangulation system 112 may calculate the relative location data for every new current-acquired target, with the immediately preceding current-acquired target becoming the last-acquired target and "new" datum target.

In some embodiments, the rolling-datum mode need not be automatic. For example, the triangulation system 112 may be configured so that a user must take one or more actions via the HMI system 124 to cause the triangulation system to calculate the relative location between the current-acquired target (i.e., triangulated target) and the last-acquired target (i.e., datum target). For example, if at least one of the user-actuated controls 124(1) to 124(N) of the HMI system 124 are buttons (e.g., hard buttons), then the triangulation system 112 may be configured to perform the triangulation calculations (see, e.g., triangulation algorithms 144B) in response to the user actuating (e.g., depressing, releasing, etc.) one or more of the at least one button. If multiple buttons are involved, the imaging system 100 may be configured to require the user to actuate the buttons simultaneously or sequentially relative to one another or some combination thereof.

In another example, the imaging system 100 may be configured to provide a hold-datum hold mode in which the imaging device retains a datum target as the datum target used for each subsequently and serially acquired new triangulation target until the user replaces the current datum target with a new datum target. In an example, the imaging system 100 may be configured to toggle between a target-acquisition mode and a triangulation mode. Once the user has established a datum target, each time the user switches to the target-acquisition mode from the triangulation mode and acquires a new target while in the target-acquisition mode, when the user toggles back into the triangulation mode, the previously established datum target remains and the newly acquired target becomes the triangulation target. In response to reentering the triangulation mode after acquiring a new triangulation target, the imaging device 200 calculates the relative location of the triangulation target relative to the datum target.

In an example of this hold-datum mode, if the user wants to replace the current datum target with the current triangulation target, the user toggles from the triangulation mode to the target acquisition mode and back to the triangulation mode without acquiring a new target while in the target-acquisition mode. This operation of toggling without acquiring a new target causes the imaging system 100 to replace the current datum target with the current triangulation target. Once done, the user can then reenter the target-acquisition mode, acquire a new target, and then toggle back to the triangulation mode to obtain a new triangulation target. This action causes the imaging system 100 to set the newly acquired target as the triangulation target and calculate the relative location of the new triangulation target relative to the datum target. Other variations are possible.

The imaging system 100 may additionally or alternatively be configured to allow a user to select, for example, from a list of previously acquired targets or one or more targets acquired by another device, such as another instantiation of the imaging system, the triangulated target, the datum target, or both the triangulated target and the datum target. For example, a user may set a datum target to use for one or more triangulations by selecting the datum target from a list (not shown) of previously acquired targets. In some embodiments, the imaging system 100 may be configured, for example, to display the list in a popup window, a dropdown menu, or on a dedicated screen, and to allow the user to select a desired one of the listed previously acquired targets as the datum target. The user identification and selection of the datum target may be performed in any suitable manner, such as via the user using one or more user-actuated controls 124(1) to 124(N), such as up and down buttons, joystick, trackball, select button, etc. In some embodiments, the imaging system may be configured to use the selected datum target for every subsequent triangulation until the user selects another datum target.

The imaging system 100 may be configured to allow a user to select a triangulated target from a list of previously acquired targets in a manner similar to the manner just described for user-selection of a datum target. In some embodiments, such list-driven selection may be in addition to or in lieu of the automatic selection of the current-acquired target as the triangulated target.

The manner(s) in which a user can select a triangulated target and/or the datum target may be user selectable. For example, the imaging system 100 may be configured to allow a user to set the manner(s) of selection in a setup menu (not shown). The imaging system 100 may be configured to allow a user to select the manner(s) of selection "on the fly", i.e., during operation of the imaging system.

Each of the one or more communication devices 116 (only one shown and labeled for convenience) may be any suitable type of communications device. In some embodiments, at least one of the communication devices 116 may be a physical connector port designed and configure for receiving an end connector of a corresponding electrical communications cable (not shown). The cable and end connector may be of any desirable standard, such as an Ethernet standard or a universal serial bus (USB) standard, among many others. Fundamentally, there is no limitation on the type of communications cable standard and, correspondingly, physical connector port, as long as the communications cable standard is compatible with the type of communications at issue. Each of the one or more communication devices 116 may alternatively or also comprise a wireless communications port (e.g., device) of any suitable type, such as a radio-frequency type (e.g., Bluetooth® radio, Wi-Fi® radio, cellular-network radio, proprietary radio, etc.) or light-based type (e.g., infrared transceiver), or other type. In some embodiments, the imaging system 100 may include multiple communication devices 116, with some or all being of the physical connector port type or some or all being of the wireless communications type.

The type(s) of the communication device(s) 116 will typically depend on the type(s) of information/data to be communicated from and/or to the imaging system 100 via the communication device(s) and the type(s) of external device(s)/system(s) that will connect to the imaging system via the communications device(s). In some examples, the information/data may be image data (e.g., video, still, single mode, multimodal, etc.) and/or other types of data, such as acquired target location data, triangulated target relative-location data, image-device settings, control signals, image-mirroring signals, and mapping data, among many others. Fundamentally, there is no limitation on the type(s) of information/data communicated from and to the imaging system via the one or more communication devices 116.

The imaging system 100 may optionally include a mapping system 148 that is configured to display a geographical map (now shown) along with acquired-target, datum target, and/or triangulated-target locations (absolute and/or relative to a corresponding datum target) acquired or determined by the target-acquisition system 108 and/or the triangulation system 112, and any other desired information of the imaging system. The mapping system 148 may be configured to function in a manner similar to well-known apps such as Google Earth and Apple Maps, among many others, that operate on smartphones, tablet computer, laptop computers, and desktop computers, among other devices, and/or may be configured to use open-source mapping data or proprietary mapping data, or a combination thereof. For example, the mapping system 148 may display location data from the target-acquisition system 108 and/or the triangulation system 112 in a manner such that a user can zoom in and zoom out, with the location data scaling appropriately with the zooming. The mapping system 148 may utilize one or more of the electronic displays 120(1) to 120(N) of the display system 120, features of the processing system 140, and/or at least one of the communications devices 116. In some embodiments, the mapping system 148 may be embodied on an "external" device (not shown, but see external devices 1100(1) to 1100(3) of FIG. 11), such as a tablet computer, smartphone, laptop computer, or other self-contained computing device, having its own processing system separate from the processing system 140 of the imaging system 100.

The processing system 140 includes the memory 140A and one or more microprocessors 140B (only one shown for convenience) operatively connected to the memory and to other components of the imaging system 100, such as the live-view imaging system 104, the target-acquisition system 108, the triangulation system 112, the communications device(s) 116, the display system 120, the HMI system 124, the IS positioning system 128, the IS orientation system 132, the ranging system 136, and/or the mapping system 148, among other things. In this example, the memory 140A conveniently represents all types of physical memory and data storage that the imaging system 100 utilizes, including, but not limited to volatile (e.g., primary memory) and nonvolatile memories (e.g., secondary memory), such as cache, random-access memory, read-only memory, solid-state storage devices, optical storage devices, and magnetic storage devices, among others. Fundamentally, there is no limitation on the type of memory that can be part of memory 140A. As used herein and in the appended claims, the term "machine-readable storage medium (media)" and the like covers physical memory and excludes any sort of coded signal.

The one or more microprocessors 140B may be any suitable type of processor(s) capable of executing machine-executable instructions, including single core and multiple core microprocessors. In some embodiments, the imaging system 100 may include only a single microprocessor 140B. In some embodiments, the imaging system 100 may include multiple microprocessors 140B that effectively act as a single microprocessor (e.g., the individual microprocessors are centralized and can process machine-executable instructions in parallel to increase the speed of the processing system 140, and hence the imaging system 100). In some embodiments, the imaging system 100 may include multiple microprocessors 140B, with one or more of the microprocessors dedicated to a particular system. For example, one or more of the imaging devices 104(1) to 104(N) may each have its own microprocessor that may communicate with a central processor (not shown) that controls the overall functionality of the imaging system 100. Many other possibilities exist for configuring the processing hardware of the imaging system 100, and all of these are within the skill of a person skilled in the art, such that further examples are not needed to those skilled in the art to understand the broad scope of the present disclosure and the claims appended hereto. Similarly, those skilled in the art will readily understand how to configure other parts of the processing system 140 not shown in FIG. 1, such as the internal communications bus(es), and power supply(ies), among other parts.

Example Instantiations

Handheld Imaging Device

As described above, an imaging system of the present disclosure, such as the imaging system 100 of FIG. 1, may be embodied in any of a variety of forms, including a handheld imaging device. FIGS. 2A to 2C illustrate an example handheld imaging device 200 embodying features and aspects of the imaging system 100 of FIG. 1. FIGS. 2A to 2C generally illustrate only external features of the handheld imaging device 200. However, it should be understood that the handheld imaging device 200 embodies the systems, features, and functionalities described above and shown in FIG. 1. Consequently, when addressing particular components of the handheld imaging device 200 of FIGS. 2A to 2C in this section, references are made to imaging system 100 of FIG. 1 that is embodied in—mostly internally—the handheld imaging device 200. Those skilled in the art will readily understand how the components of imaging system 100 of FIG. 1 that are not illustrated in FIGS. 2A to 2C may be physically embodied within the handheld imaging device 200 of FIGS. 2A to 2C, such that it is not necessary to show or describe in detail how such physical embodying is effected for those skilled in the art to understand how to make and use the handheld imaging device of FIGS. 2A to 2C with the components of imaging system of FIG. 1.

Referring to FIGS. 2A to 2C, and also to FIG. 1 as indicated (FIGS. 2A to 2C have 200-series element numerals and FIG. 1 has 100-series element numerals), the handheld imaging device 200 is a bi-ocular imaging device that includes a housing 204 and has a pair of eyepieces 208L and 208R (FIGS. 2A and 2B) for viewing an internal viewfinder display (not shown, but is part of display device 120(1) of display system 120). As seen in FIG. 2C, the handheld imaging device 200 also includes a lens opening 212 for a visible light camera (e.g., imaging device 104(1) of the live-view imaging system 104), a lens opening 216 for a thermal imager (e.g., imaging device 104(2) of the live view imaging system), a pair of openings 220(1) and 220(2) for a laser range finder (LRF) (e.g., ranging device 136(1) of the ranging system 136), pair of communication ports 224(1) and 224(2) (corresponding to communication devices 116(1) and 116(2)) (here, a pair of Fischer ports) and a pair of corresponding port closures 228(1) and 228(2), a battery-compartment closure 232 for closing and sealing a battery compartment (not shown) for one or more batteries (not shown) that power the handheld imaging device, and a user-activated/deactivated laser pointer 236.

Referring to FIG. 2B, the handheld imaging device 200 includes a power switch 240, which may be considered a user-actuated control 124(1) of the HMI system 124, that allows a user to power-on and power-off the handheld imaging device as desired, for example, to reduce power consumption when the user is not using the handheld imaging device. As seen in FIGS. 2A to 2C, the housing 204 is shaped and sized to be handheld by a user by gripping the housing on sides 204L and 204R of the housing. A pair of hand straps 244L and 244R (FIGS. 2A and 2B) are provided in this instantiation to assist the user with holding and stabilizing the handheld imaging device 200 during use.

In this instantiation, the handheld imaging device 200 is provided with four hard buttons for each of the user's left and right hands (not shown), with these buttons being located so that the user can readily access them with their fingers and thumbs when the user is gripping the housing 204 with both hands. These buttons corresponding to user-actuated controls 124(2) to 124(8) of the HMI system 124 and for convenience are referred to as L1, L2, L3, and LT for the left hand and R1, R2, R3, and RT for the right hand, with the "1", "2", "3", and "T" corresponding, respectively, to the index finger, middle finger, ring finger, and thumb on the respective hand. Some functions of these buttons are described below in examples of acquiring targets and identifying datums, among other things. As seen in FIG. 2B, the handheld imaging device also includes a switch 248 (e.g., user-actuated control 124(10) of the HMI system 124) for controlling brightness of the internal viewfinder display.

Example Target-Acquisition Mode

Figure 3:
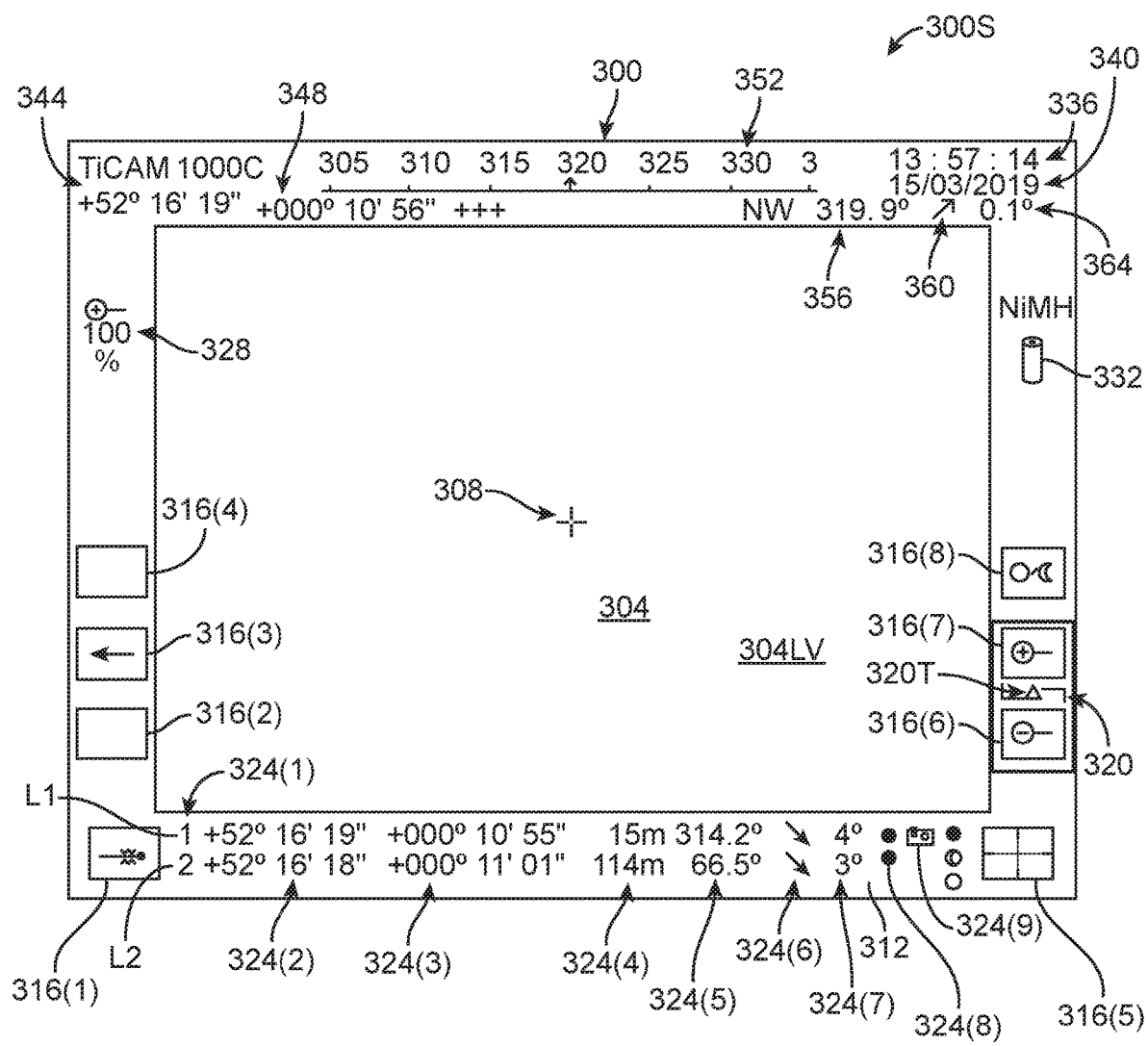
FIG. 3 is screenshot of an example graphical user interface (GUI) displayed on the internal viewfinder display of the handheld imaging device of FIGS. 2A to 2C, showing the GUI when the handheld imaging device in a target-acquisition mode.

FIG. 3 is an example screenshot 300S of a GUI 300 that the internal viewfinder display (not shown, but see the display device 120(1) of FIG. 1) displays when the handheld imaging device 200 of FIGS. 2A to 2C—and correspondingly the imaging system 100 of FIG. 1—is in a target-acquisition mode. In this example, the screenshot 300 includes an image-display region 304 that displays live-view image 304LV as captured by the visible-light camera (imaging device 104(1)) or the thermal imager (imaging device 104(2)), or both (e.g., as a overlaid image). The image-display region 304 includes an aiming reticle 308 at its geometric center. The aiming reticle 308 visually identifies the aim of the LRF and/or the laser pointer 236, along with the status of the LRF (see FIGS. 5A to 5C and the corresponding description below).

In this example, the image-display region 304 is surrounded by an information-display region 312 that displays a host of status and/or data information to the user, including eight function-display regions (here, function-display boxes 316(1) to 316(8)) corresponding, respectively and positionally, to hard buttons LT, L1, L2, L3, RT, R1, R2, and R3 on the exterior of the handheld imaging device 200 (FIGS. 2A and 2B). As can be readily seen in FIG. 3, each of the function-display boxes 316(1) to 316(8) shows the function, if any, of the corresponding hard button LT, L1, L2, L3, RT, R1, R2, and R3. In the screenshot 300, function-display box 316(1) shows that the hard button LT operates the laser pointer 236 (FIG. 2C), function-display box 316(3) shows that the hard button L2 allows the user to escape to a previous menu, function-display box 316(5) shows that the hard button RT allows the user to control the operation of the LRF, function-display box 316(6) shows that the hard button R1 allows the user to scroll down through the current menu, function-display box 316(7) shows that the hard button R2 allows the user scroll up through the current menu, and function-display box 316(8) shows that the hard button R3 allows the user to toggle between day and night modes. In addition, an additional function-display indicator 320 shows that the user can enter the triangulation mode (represented by the triangle 320T) by pressing hard buttons R2 and R3 simultaneously with one another. Examples of control and operation of the handheld imaging device 200 (FIGS. 2A to 2C) (and corresponding embodiment of the imaging system 100 (FIG. 1) are described below in detail.

Also in this example, the information-display region 312 includes two lines L1 and L2 that contain information about the two most recently acquired targets, with line L1 containing information about the most recently acquired target and line L2 containing information about the target acquired immediately before the most recently acquired target. Each line L1 and L2 includes a line number 324(1), a latitude value 324(2), a longitude value 324(3), a range (distance) value 324(4) (from the handheld imaging device 200 (FIGS. 2A-2C) and imaging system 100 (FIG. 1)), a bearing-angle value 324(5) (from the handheld imaging device/imaging system), an inclination/declination indicator 324(6) (relative to the handheld imaging device/imaging system), an inclination/declination angle 324(7) (relative to the handheld imaging device/imaging system), an indicator 324(8) indicating whether a thermal image was captured, and an indicator 324(9) indicating whether a visible-light images was captured.

Figure 4:
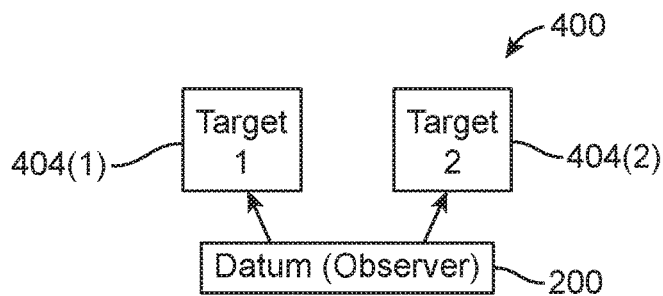
FIG. 4 is a diagram showing an example scenario in which a user uses the handheld imaging device of FIGS. 2A to 2C to acquire first and second targets.

FIG. 4 depicts a scenario 400 in which a user (not shown) uses the handheld imaging device 200 (FIGS. 2A to 2C) to acquired two targets, here Target 1 404(1) and Target 2 404(2). Relative to screenshot 300 of FIG. 3 and assuming the user caused the handheld imaging device 200 to acquire Target 1 404(1) and Target 2 404(2) in order, the target-location information on line L2 is for Target 1, and the target-location information on line L1 is for Target 2. In this example, for each of Target 1 and Target 2, 404(1) and 404(2), respectively, the handheld imaging device 200 determines a range value 324(4), a bearing-angle value 324(5), an inclination/declination indicator 324(6), and an inclination/declination angle 324(7), all relative to the handheld imaging device, which is considered the datum for these determinations.

Also in this example, the information-display region 312 also includes a magnification level indicator 328 for the image(s) in the image-display region 304, a battery level indicator 332, a current-time indicator 336, a date indicator 340, current location indicators 344, 348 indicating the current latitude and longitude, respectively, of the handheld imaging device (FIGS. 2A to 2C)/imaging system 100 (FIG. 1), a digital magnetic compass (DMC) bearing indicator 352, a current aim bearing indicator 356 that indicates the bearing of the current-aim (as determined by the aiming reticle 308), a current-aim inclination/declination indicator 360, and a current-aim inclination/declination angle indicator 364.

Figure 5A:
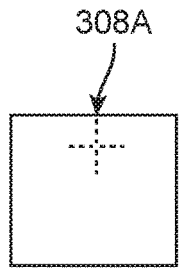
FIG. 5A is a screenshot showing the aiming reticle of the image-display region of the GUI of FIG. 3 when the handheld imaging device is in the imaging mode.
Figure 5B:
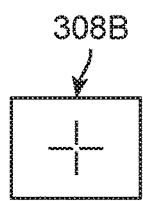
FIG. 5B is a screenshot showing the aiming reticle of the image-display region of the GUI of FIG. 3 when the handheld imaging device is in the target-acquisition mode and the range finder is active.
Figure 5C:
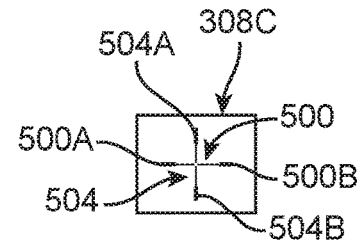
FIG. 5C is a screenshot showing the aiming reticle of the image-display region of the GUI of FIG. 3 when the handheld imaging device is in the target-acquisition mode and the range finder is in a firing mode.

As mentioned above, in this embodiment the aiming reticle 308 indicates the status of the LRF, and FIGS. 5A to 5C illustrate the appearance of the aiming reticle for three statuses, respectively: LRF not active (dashed-line form 308A), LRF active (solid-line form 308B), and LRF ready to fire (multi-line-weight form 308C). In this example, the aiming reticle 308 of the crosshairs type, but other types can be used. When the LRF is not active, as seen in FIG. 5A the aiming reticle 308 is composed of dashed lines in the dashed-lined form 308A. "Not active" can mean that the LRF is in a powered-off or other low-power-consumption mode. In the not-active mode, a user can use other features of the handheld imaging device 200, such as the visible-light and/or thermal imaging features and the laser pointer 236 (FIG. 2C), among others, as well as read the current position and bearing information available via the corresponding respective indicators 344, 348, 352, 356, 360, and 364.

When the LRF is active (e.g., power-on), the handheld imaging device 200 (FIGS. 2A to 2C) changes the aiming reticle 308 to the solid-line form 300B, as shown in FIG. 5B. In one example, the user may activate the LRF by single-pressing the hard button RT (FIG. 2B) (see also function-display box 316(5) of FIG. 3 that contains a symbol 316(5)A that graphically represents the LRF to indicate to the user the function of the hard button RT).

When the LRF is active and the user is ready to acquire a target, such as either Target 1 404(1) or Target 2 404(2) of FIG. 4, in this example the user first depresses the hard button RT (FIG. 2B; see also function-display box 316(5)) and holds the hard button RT in the depressed position. Doing so causes the LRF to enter the ready-to-fire mode and the handheld imaging device 200 (FIGS. 2A to 2C) to change the aiming reticle 308 from the solid-line form 308B of FIG. 5B to the multi-line-weight form 308C of FIG. 5C in which the crosshair lines 500 and 504 have visually thicker ends 500A, 500B, 504A, 504B. When the handheld imaging device 200 (FIGS. 2A to 2C) displays the multi-line-weight form 308C of the aiming reticle 308 in the image-display region 304 (FIG. 3), this visually alerts the user that they can fire the LRF to acquire a target when they are ready. In this embodiment, the user fires the LRF to acquire a target by releasing the currently depressed hard button RT (FIG. 2B; see also function-display box 316(5)). In response to the user releasing the hard button RT, the handheld imaging device 200 fires the LRF, acquires the relevant target, and displays the corresponding target location information on line L1 of the GUI 300 (FIG. 3). In conjunction with displaying the newly acquired target location information on line L1 (FIG. 3), the handheld imaging device 200 effectively shifts the target location information that was on line L1 down to line L2. This shifting of target location information can continue with the user successively causing the handheld imaging device 200 to acquire new targets.

Example Triangulation Mode

Once the handheld imaging device 200 (FIGS. 2A to 2C) has acquired a reference datum target via a single firing of the LRF or multiple firings of the LRF, in this example and as mentioned above, the user simultaneously presses both hard buttons R1 and R2 (FIG. 2A; see also function-display boxes 316(6) and 316(7) of FIG. 3) to select the triangulation mode. FIG. 6 is an example screenshot 600 of the GUI 300 (also, FIG. 3) that the internal viewfinder display (not shown, but see the display device 120(1) of FIG. 1) displays when the handheld imaging device 200 of FIGS. 2A to 2C—and correspondingly the imaging system 100 of FIG. 1—is in the triangulation mode. In one example, the triangulation mode is not available unless the handheld imaging device has acquired at least one target in the target acquisition mode.

Comparing the screenshot 600 of FIG. 6 with the screenshot 300S of FIG. 3, it can be seen that much of the information that the GUI 300 displays when the handheld imaging device 200 is in the triangulation mode (FIG. 6) is of the same nature that the GUI displays when the handheld imaging device is in the target-acquisition mode (FIG. 3). Generally, the primary differences are that, when in the triangulation mode, the handheld imaging device 200 displays a triangulation mode indicator, here, a triangular symbol 604 surrounding the aiming reticle 308, and third line L3 containing triangulation data, here a difference between the locations of the two acquired targets shown, respectively, on lines L1 and L2, and expressed by a distance value 608, a bearing angle value 612 (from the datum target (line L2) and the desired triangulation target (line 1), an inclination/declination indicator 616, and an inclination/declination angle value 620. In this example, when the handheld imaging device 200 is in the triangulation mode, it displays data-type symbols 624(1) to 624(3) that represents the types of data on the corresponding lines L1 to L3. In this example, the data-type symbol 624(2) (here, a pin) indicates that line L2 contains location and other information for datum target, the data-type symbol 624(1) (here, a crosshairs symbol) indicates that line L1 contains location and other information for the desired triangulation target that the handheld imaging device 200 performs triangulation calculations (see, e.g., triangulation algorithms 144B of FIG. 1) to determine the location of the desired triangulation target relative to the location of the datum target, and data-type symbol 624(3) (here, a delta symbol) indicates that line L3 contains data expressing the difference in location of the desired triangulation target relative to the location of the datum target. Other data-type symbols may be used.

In one example, the handheld imaging device 200 (FIGS. 2A to 2C) may automatically use the last-acquired target as the datum target. In another example, when the handheld imaging device 200 has recently acquired a plurality of targets, the GUI 300 (FIGS. 3 and 6) may prompt the user to select, for example, from a list (not shown) (such as a dropdown list of popup list), one of the previously-acquired targets as the datum target. In some embodiments, the handheld imaging device 200 may be configured to allow the user to select a new datum target by pressing the triangulation-mode button(s), here hard buttons R1 and R2 (FIG. 2B; see also function-display boxes 316(6) and 316(7) (FIG. 3) twice in succession. In this example, when the handheld imaging device 200 is in the triangulation mode the first of the two presses returns the handheld imaging device to the target-acquisition mode. At this point, the handheld imaging device 200 is still displaying the last-acquired target data in line L1 (see FIG. 3). The second of the two presses causes the handheld imaging device to reenter the triangulation mode (see FIG. 6). The last acquired target data is now displayed in line L2 as the new datum target, which is pinned for the time being as indicated by data-type symbol 624(2) of FIG. 6. At this point, the user can now control the handheld imaging device 200 to acquire a new triangulation target, display the location data for the new triangulation target in line L1, and computed triangulation difference data and display the difference data in line L3 of FIG. 6.

The handheld imaging device 200 may be configured so that the user can perform the process of selecting a new triangulation target multiple times as required to replace the datum target with the most-recent target. In some examples, the handheld imaging device 200 provides an easy mechanism for the user to 1) measure a plurality of target locations relative to the observer (i.e., the handheld imaging device (e.g., in the target-acquisition made), 2) measure a plurality of target locations relative to a datum separate from the observer (in the triangulation mode), and 3) select a new datum target and measure a plurality of target locations relative to the new datum target (in the triangulation mode). In some examples, a datum target can be pinned for use in triangulating multiple additionally acquired desired triangulation targets.

In a pinned datum target scenario, the user keeps the handheld imaging device 200 in the triangulation mode. While remaining in the triangulation mode, the handheld imaging device 200 effectively pins the current datum target to line L2 (FIG. 6) and allows the user to successively fire the LRF to acquire new triangulation targets. The handheld imaging device 200 sequentially displays and replaces the location and other information on line L1 (FIG. 6) and calculates and displays on line L3 (FIG. 6), for each newly acquired triangulation target, the relative location of the triangulation target relative to the pinned datum target.

Figure 7A:
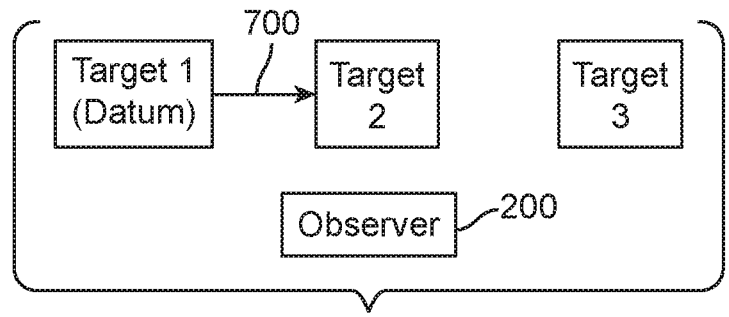
FIG. 7A is a diagram showing an example scenario in which a user uses the handheld imaging device of FIGS. 2A to 2C to determine a relative location of a Target 2 (a triangulation target) to a Target 1 (a datum target)
Figure 7B:
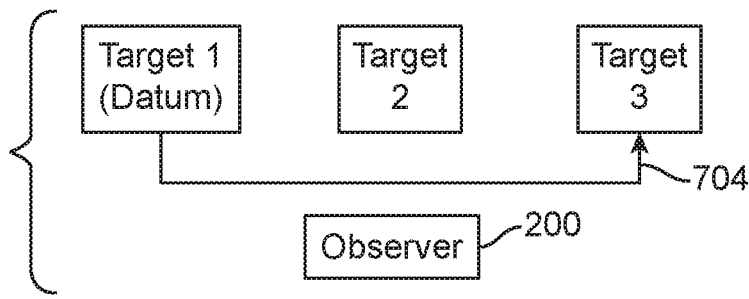
FIG. 7B is a diagram showing an example scenario in which a user uses the handheld imaging device of FIGS. 2A to 2C to determine a relative location of a Target 3 (a triangulation target) to Target 1 (a datum target) of FIG. 7A.

FIGS. 7A and 7B illustrate the pinned datum target scenario for three targets, "Target 1", "Target 2", and "Target 3". In FIG. 7A, Target 1 has been established at the datum target and would appear on line L2 of FIG. 6. In one example, the user establishes Target 1 as the datum target by toggling the handheld imaging device 200 (also labeled "Observer" in FIGS. 7A and 7B) from the target-acquisition mode to the triangulation mode when Target 1 is the last-acquired target, with its location information displayed on line L1 (FIG. 6). The user then acquires Target 2 by firing the LRF, which causes the handheld imaging device 200 to display the location information for Target 2 on line L1 of FIG. 6, to calculate the relative location (represented by arrow 700 in FIG. 7A) of Target 2 (i.e., the triangulation target) relative to Target 1 (i.e., the datum target), and display the relative location on line L3 of FIG. 6. It is noted that the handheld imaging device 200 may also store all of the relevant information, as discussed above in connection with FIG.1.

As illustrated by FIG. 7B, after the handheld imaging device determines the relative location of Target 2 relative to Target 1, the user now desires to know the relative location (represented by arrow 704 in FIG. 7B) of a new target, "Target 3", relative to Target 1. To do this, while the handheld imaging device 200 remains in the triangulation mode, the user fires the LRF to acquire Target 3. In response to the handheld imaging device 200 successfully acquiring Target 3, it replaces the information regarding Target 2 on line L1 (FIG. 6) with information regarding Target 3, calculates the relative location 704 (FIG. 7B) of Target 3 (i.e., the triangulation target) relative to Target 1 (i.e., the datum target), and displays the relative location on line L3 of FIG. 6. The user can continue to acquire new triangulation targets and have the handheld imaging device 200 calculate new relative locations for these new triangulation targets relative to the same datum target, Target 1, simply by keeping the handheld imaging device in the triangulation mode.

Figure 8:
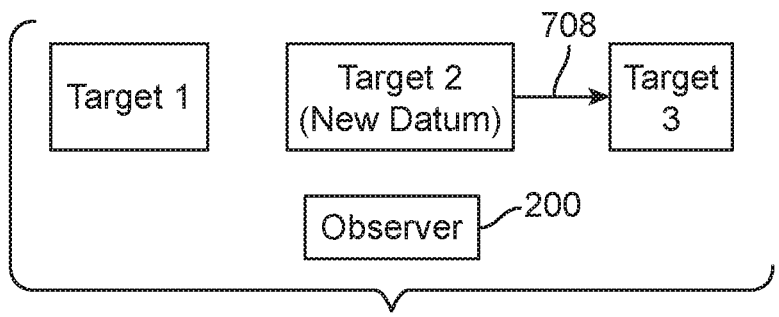
FIG. 8 is a diagram showing an example scenario in which a user uses the handheld imaging device of FIGS. 2A to 2C to set Target 2 of FIGS. 7A and 7B as the datum target and determine a relative location of Target 3 (a triangulation target) to Target 2 (a datum target)

Reverting back to where Target 1 is the datum target and Target 2 is the triangulation target being triangulated with respect to Target 1 (see FIG. 7A), the user can decide to make Target 2 the new datum target so that Target 3, i.e., the triangulation target, is triangulated with respect to Target 2. This is illustrated in FIG. 8, wherein the user (observer) is performing the triangulation operations with the handheld imaging device 200 remote from Targets 1 to 3. In one example, the user may selectively alternate datum targets between two or more previously acquired targets by pressing the triangulation select button or button combination simultaneously, here, the hard buttons R1 and R2 (FIG. 2A), to revert the handheld imaging device 200 from the triangulation mode to the target acquisition mode, and then repressing the hard button R1 and R2 to reenter the triangulation mode. As noted above, in one example, when transitioning from the target acquisition mode to the triangulation mode, the handheld imaging device 200 may be configured to select the most recently acquired target as the datum target. In such a configuration, because Target 2 was the most recently acquired target acquired in triangulation mode, the handheld imaging device 200 automatically selects and displays Target 2's location data, here, on line L2 (FIG. 6) of the GUI 300. As also mentioned above, in another example (not shown), the user may alternatively press one or more of the hard buttons LT, L1, L2, L3, RT, R1, R2, and R3 (FIGS. 2A and 2B) while the handheld imaging device 200 is in the triangulation mode to display a menu of a plurality of previously acquired targets, ordered, for example, based on the time of acquisition. In this example, the user may be able to press one or more of the hard buttons LT, L1, L2, L3, RT, R1, R2, and R3 (FIGS. 2A and 2B) to select one of the targets as the new datum. Other processes for selecting a desired datum target may be used. Once the user has selected a new datum target, they may depress and release the LRF firing button (here, hard button RT (FIG. 2B)) to acquire position information for a new target, here, Target 3 (FIG. 8), which causes the handheld imaging device 200 to display information for Target 3 on line L1 (FIG. 6) of the GUI 300, as well as calculate the relative location (represented by arrow 708 in FIG. 8) of Target 3 (triangulation target) relative to Target 2 (datum target).

Figure 9:
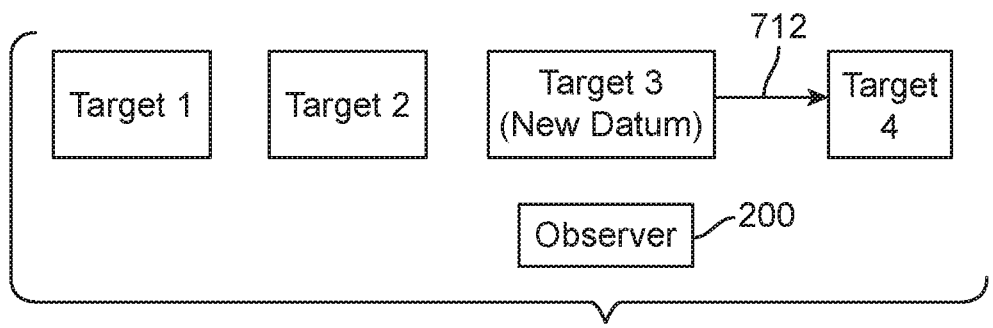
FIG. 9 is a diagram showing an example scenario in which a user uses the handheld imaging device of FIGS. 2A to 2C to set Target 3 of FIGS. 7A, 7B, and 8 as the datum target and determine a relative location of a Target 4 (a triangulation target) to Target 3 (a datum target)

In FIG. 9, the user has acquired Target 3 as described immediately above, and now wants to establish Target 3 as the datum target and acquire a new Target 4 (i.e., the triangulation target) and learn the relative location (represented by arrow 712 in FIG. 9) of Target 4 relative to Target 3 (i.e., the datum target). To perform this process with the handheld imaging device 200 and starting with the handheld imaging device in the triangulation mode, the user presses the hard buttons R1 and R2 (FIG. 2A) simultaneously with one another and then releases them to cause the handheld imaging device to change from the triangulation mode to the target-acquisition mode. Then, the user again presses the hard buttons R1 and R2 simultaneously with one another to put the handheld imaging device 200 back into the triangulation mode. When the user caused the handheld imaging device 200 to exit the triangulation mode, the information for Target 3 was on line L1 (FIG. 6). Immediately thereafter reentering the triangulation mode, the handheld imaging device 200 moves the information for Target 3 from line L1 (FIG. 6) to line L2 and makes Target 3 the new datum target. While in the triangulation mode, the user then aims the handheld imaging device 200 at Target 4 and fires the LRF as described above. Upon acquiring Target 4, the handheld imaging device 200 displays location and other information regarding Target 4 on line L1 (FIG. 6) and calculates the relative location of Target 4 relative to Target 3 and displays the relative location of line L3.

At this point, the user may acquire another target (not shown) to be located relative to the current datum target, here, Target 3, set Target 4 as the new datum target, or exit the triangulation and target-acquisition modes, for example, to perform some other tasks. As above, if the user wants to acquire another target for location relative to the current datum (Target 3), the user presses the hard buttons R1 and R2 simultaneously with one another to enter the target-acquisition mode from the triangulation mode, acquires the new target (not shown), which causes the handheld imaging device 200 to display the new target location information on line L1 (FIG. 6), replacing the information for Target 4, and then again press the hard buttons R1 and R2 simultaneously with one another to reenter the triangulation mode so that the handheld imaging device calculates the relative location of the newly acquired target relative to the datum target, here, Target 3. The user can continue to use the current datum target, Target 3, for additional new targets by toggling back and forth into and out of the target-acquisition mode from the triangulation mode and acquiring a new target each time while in the target-acquisition mode.

If the user wants to use the most-recently acquired target as the new datum target, for example use the most-recently acquired Target 4 as the new datum target, in the manner discussed above relative to setting other new datum targets, the user presses R1 and R2 simultaneously with one another two times in a row. The first press changes the handheld imaging device 200 from the current triangulation mode to the target-acquisition mode, and the second press returns the handheld imaging device back to the triangulation mode from the target-acquisition mode. When the user toggles from the triangulation mode to the target-acquisition mode and back to the triangulation mode without acquiring any targets while in the target-acquisition mode, the handheld imaging device 200 responds by making the most-recently acquired target, here, Target 4, the new datum target and correspondingly moves the information for Target 4 from line L1 to line L2 (FIG. 6).

Figure 10:
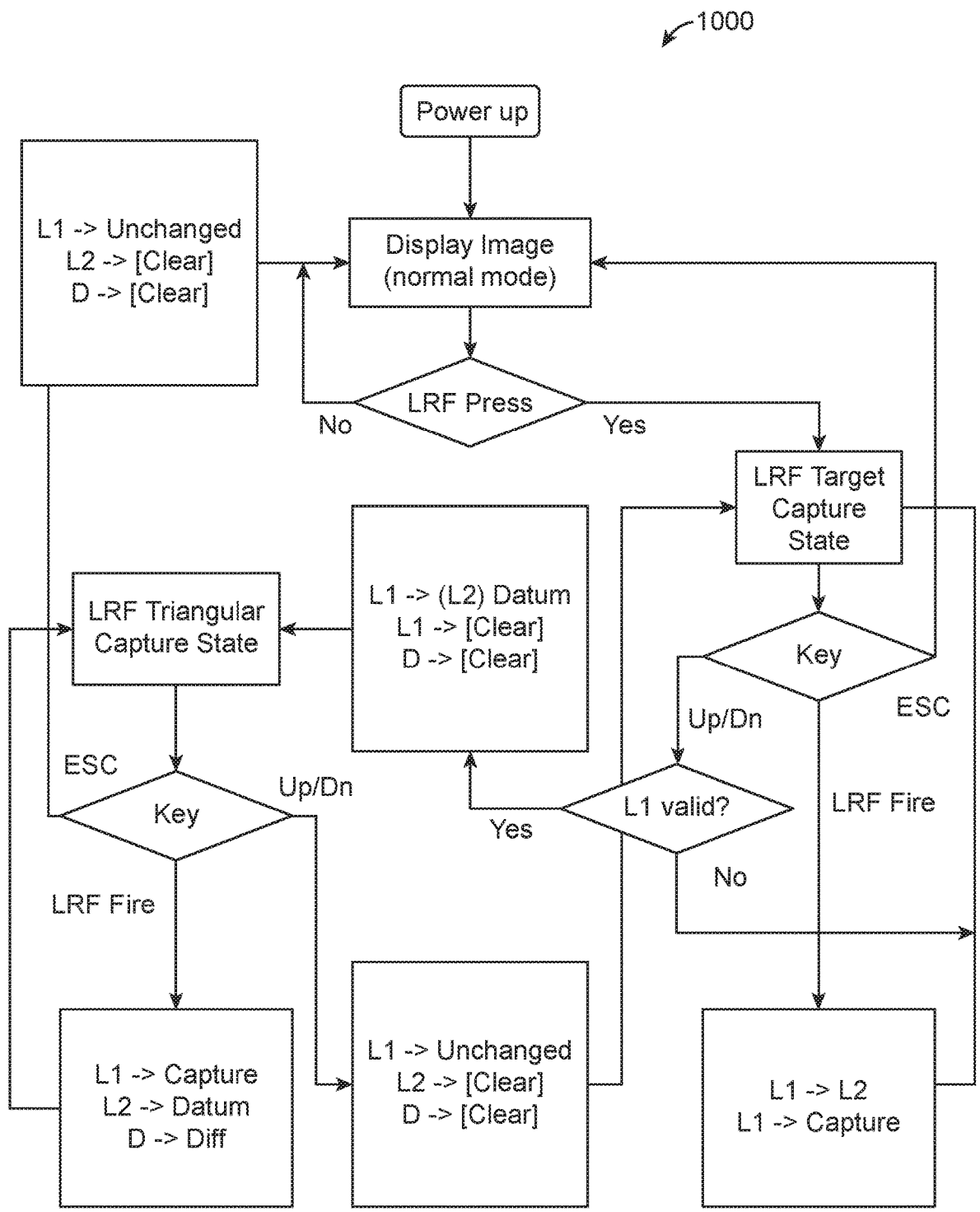
FIG. 10 is a flow diagram illustrating an example functioning of the handheld imaging device of FIGS. 2A to 2C, and correspondingly components of the imaging system 100 of FIG. 1 embodied therein, in determining (e.g., acquiring) datum targets and triangulation targets.

FIG. 10 is a flow diagram 1000 that illustrates an example functioning of the handheld imaging device 200 (FIGS. 2A to 2C), and correspondingly components of the imaging system 100 of FIG. 1 embodied therein, in determining (e.g., acquiring) datum targets and triangulation targets. In the flow diagram, various abbreviations and terms have the following meanings:

"L1" refers to line L1 of the GUI 300 (see FIGS. 3 and 6);
"L2" refers to line L2 of the GUI 300 (see FIGS. 3 and 6);
    as the user acquires subsequent targets, the handheld imaging device 200 transfers the information on line L1 to line L2;
"D" refers to the relative location of the triangulation target to the datum target, i.e., the "difference" between the locations of the two targets; the handheld imaging device displays the relative location, D, on line L3 of the GUI 300;

"Up/Dn" refers to the pressing of the button R2 and R1 (Up and Down buttons) of FIG. 2A simultaneously with one another to cause the handheld imaging device 200 to enter its triangulation mode;

"L1->L2" means that the handheld imaging device 200 moves the information on line L1 to line L2;

"Esc" means escape or return to the previous menu mode; this may be achieved, for example, by the user pressing button RT (FIG. 2B);

"LRF" refers to the laser range finder, and "Fire" refers to activating the LRF by pressing, for example, by pressing button RT (FIG. 2B);

"Key" refers to the input(s) received from the user via one or more buttons L1, L2, L3, LT, R1, R2, R3, RT of the handheld imaging device 200 (FIGS. 2A and 2B); and "Valid" means that the relevant data, e.g., GPS and/or ranging data, for an attempted target acquisition is valid.

Flow diagram 1000 of FIG. 10 is self-explanatory in view of the foregoing meanings and the above examples.

In the present embodiment, a button press or a combination of button presses allows the user to change the operating mode of the handheld imaging device 200 (FIGS. 2A to 2C), and the live-view imaging system 104 thereof, between thermal imaging, visual imaging, and clear optical viewing, or a combination thereof, to allow the most effective means to visually identify the target subject to be selected by viewing the viewfinder before firing the LRF to acquire the position of a datum target and/or a triangulation target. In one example, the user may select the imaging mode in parallel with target acquisition and triangulation, such that imaging modes can be changed simultaneously with, or in parallel with target acquisition and triangulation. In other embodiments, an imaging device with only one of thermal imaging, visual imaging, and clear optical viewing, or only two of any combination thereof may include the targeting and triangulation features and functions disclosed herein.

Example Mapping Functionality

Figure 11:
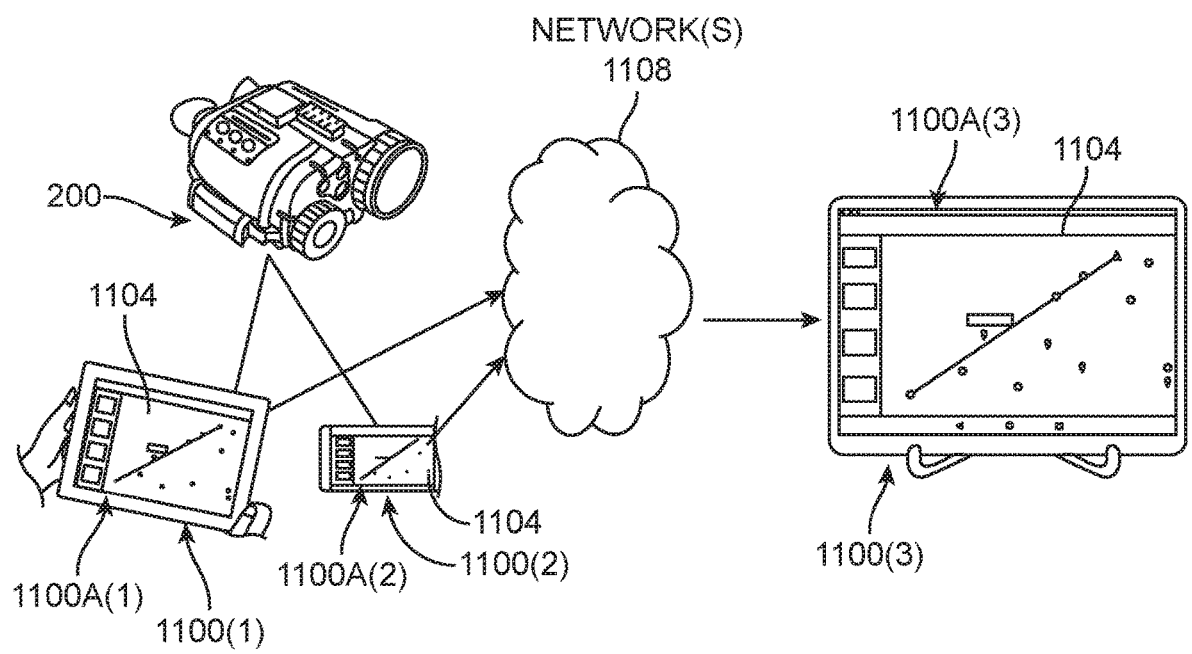
FIG. 11 is a diagram illustrating devices for implementing mapping functionalities of an imaging system of the present disclosure, illustrating connectivities among the devices.

Referring to FIG. 11, in some embodiments the mapping system 148 of FIG. 1 may be implemented, for example, in the handheld imaging device 200 (see also FIGS. 2A to 2C) and/or any suitable external device, such as any of the external devices 1100(1) to 1100(3). As mentioned above in the context of FIG. 1, each of the external devices 1100(1) to 1100(3) may be any suitable device, such as a tablet computer, smartphone, laptop computer, or other self-contained computing device, having its own processing system separate from the processing system 140 (FIG.1) of the handheld imaging device 200. If/when an external device, such as any of external devices 1100(1) to 1100(3) are involved, communication between the such external device and the handheld imaging device 200 may be through any suitable communication channel, such as a wired channel (e.g., a universal serial bus (USB) channel or an Ethernet channel), a wireless channel (e.g., a Wi-Fi® channel or a Bluetooth® channel), and/or via one or more communications networks 1108 (e.g., a personal area network, a local area network, a wide-area network, a cellular network, and/or a global network (e.g., the Internet), among others), and/or via any suitable type of messaging protocol, such as a proprietary messaging protocol, an email protocol, and/or a direct-messaging protocol (such as provided by conventional smartphone messaging apps), among others. Fundamentally, there are no limitations on the communications scheme(s) used other than that it/they can convey the necessary or desired information.

Information communicated between the handheld imaging device 200 and a external device, such as any of the external devices 1100(1) to 1100(3), for implementing features of the mapping system 148 (FIG. 1), may include, but not be limited to location data (target, handheld imaging device), target type (e.g., datum or non-datum), target status (e.g., currently selected), images (thermal, visible light), handheld imaging device identification and/or settings), external device identification, among others. Those skilled in he art will readily understand the information that is needed and/or desired to be communicated between the handheld imaging device 200 and an external device, such as any of the external devices 1100(1) to 1100(3), such that further explanation is not necessary for those skilled in the art to understand how to implement mapping functionality in the handheld imaging device and/or any suitable external device.

Following are example functionalities that can be embodied in the mapping system 148 (FIG. 1). Unless otherwise noted or apparent by the nature of the functionality, the functionalities described can be implemented in either of the handheld imaging device 200 or the external device 1100(1) to 1100(3), or both. The example functionalities are described as being implemented in an example GUI 1104. When the example GUI 1104 is displayed by the handheld imaging device 200, the handheld imaging device may display it on its internal viewfinder display (not shown) or on an external display (not shown) that may be connected via a suitable port, such a one of the Fisher ports (see communication devices 116(1) and 116(2) of FIG. 1 and port closures 228(1) and 228(2) of FIG. 2C) on the handheld imaging device. When the example GUI is displayed by an external device, such as any of the external devices 1100(1) to 1100(3) of FIG. 11, the external device may display it on its integrated display, such as any one of the integrated displays 1100A(1) to 1100A(3). Functionalities of the mapping system 148 (FIG. 1) may be controlled via the GUI 1104 using any available user-actuated controls, such as hard buttons L1, L2, L3, LT, R1, R2, R3, RT (FIGS. 2A and 2B) on the handheld imaging device, and any hard or soft user-actuated controls (not shown) on the external devices 1100(1) to 1100(3). In some embodiments, each integrated display 1100A(1) to 1100A(3) may be a touchscreen display, and GUI 1104 may be configured to respond to a variety of gestures commonly known in the context of touchscreen-type devices. Although not specifically illustrated, each external device 1100(1) to 1100(3) may be operated and controlled by a processing system that may be the same as or similar to the processing system 140 of the imaging system 100 of FIG. 1. The construction of devices suitable for the external devices 1100(1) to 1100(3) is well known to include one or more microprocessors and any one or more types of physical memory that contains machine-executable instructions for providing the functionalities described herein and needed to operate the external devices.

Figure 12:
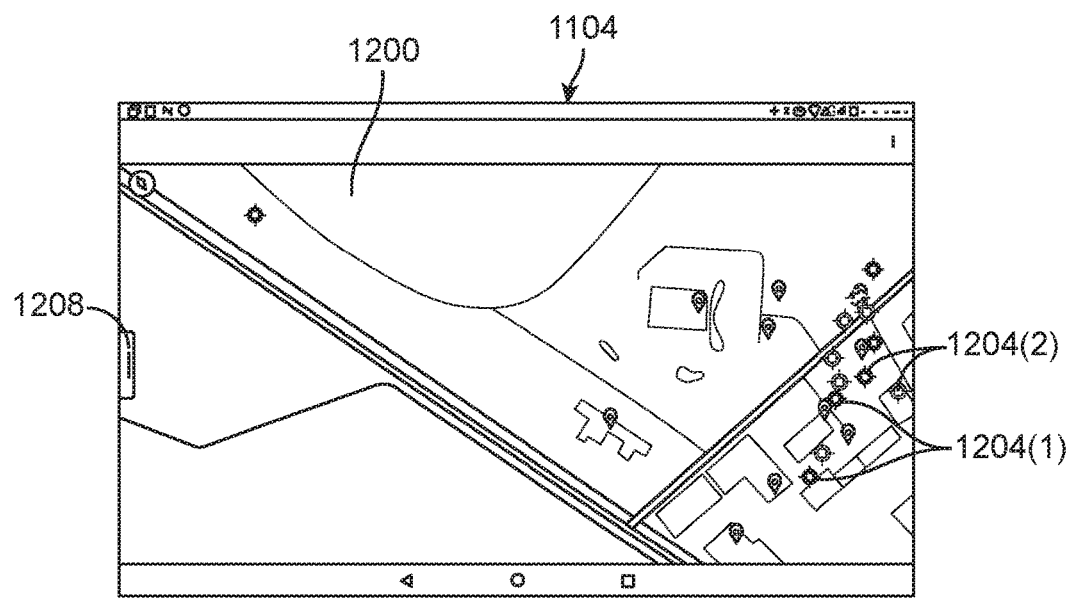
FIG. 12 includes a screenshot of the example GUI of the devices of FIG. 11 showing a map containing locations of a plurality of acquired targets and also includes a legend of symbols used on the map.

FIG. 12 shows GUI 1104 displaying a map 1200, which in this example is a virtual-view map. In some embodiments, the GUI 1104 may be configured to allow a user to switch between the virtual view, a satellite view, and/or a hybrid view composed of the virtual view overlaid onto the satellite view. In some embodiments, the GUI 1104 may be configured to display only of type of view. The GUI 1104 displays acquired targets using specialized symbols 1204(1) and 1204(2) (only a few labeled to avoid clutter) representing the manner in which a user acquired the target, either thermally (IR) or visually (Visible CCD). The acquired targets shown on the map 1200 may be targets acquired by handheld imaging device 200 (FIG. 11) and/or any other devices (not shown (e.g., other instantiations of the handheld imaging device) that can acquire location information for a desired target.

Figure 13:
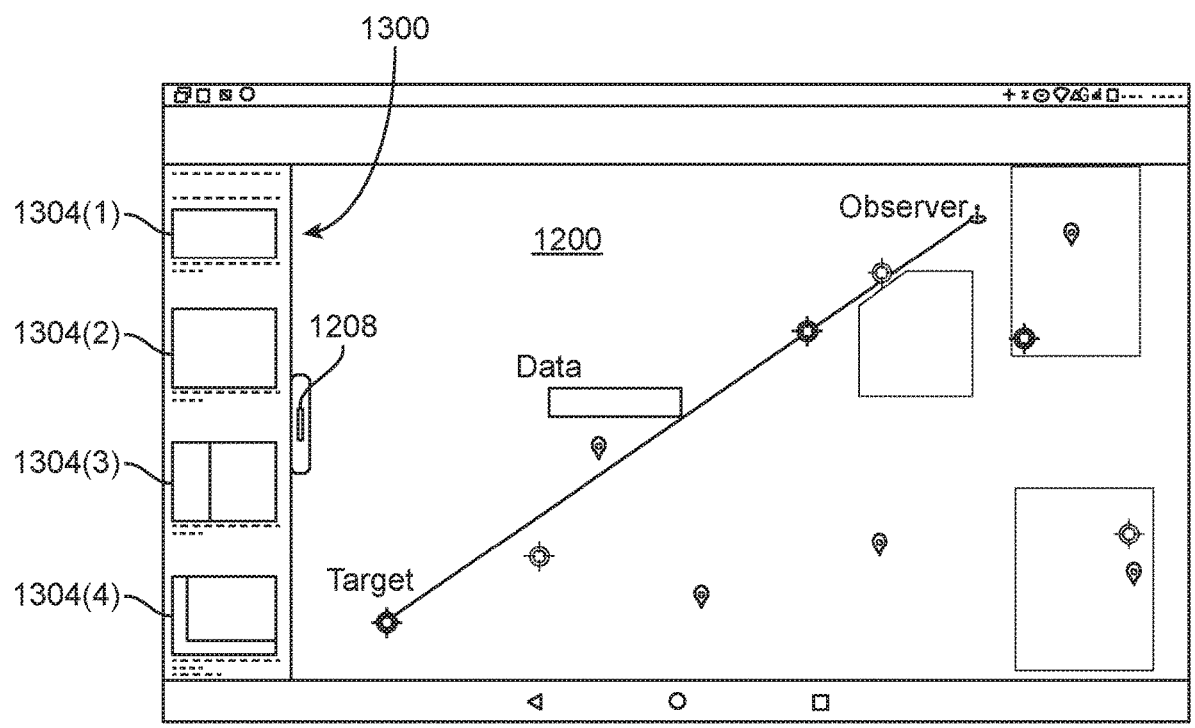
FIG. 13 is a screenshot of the example GUI of FIG. 12 showing the image gallery containing images of acquired targets.

In this example, GUI 1104 includes a side tab 1208 that allows a user to open an image gallery 1300, as illustrated in FIG. 13, though with a different view of the map 1200. Referring to FIG. 13, in this example, the image gallery 1300 is displaying images 1304(1) to 1304(4) of targets shown on the map 1200. Depending on the number of images within the image gallery 1300, the GUI 1104 may be configured to allow a user to scroll through the images. In this example, a user may use a filter to order the images 1304(1) to 1304(4) in any one or more of a variety of ways, such as by serial number of the acquiring device, such as handheld imaging device 200 (FIG. 11), by date/time, and type (e.g., thermal (IR)/visual) of image, among others. When the user selects (e.g., by a touchscreen touching/tapping gesture or selecting via a hard button) one of the images in the image gallery 1300, such as one of the images 1304(1) to 1304(4), the GUI may be configured to highlight the corresponding target symbol on the map and/or display further details of the selected image, such as in a popup target-details window 1400 as illustrated in FIG. 14.

Figure 14:
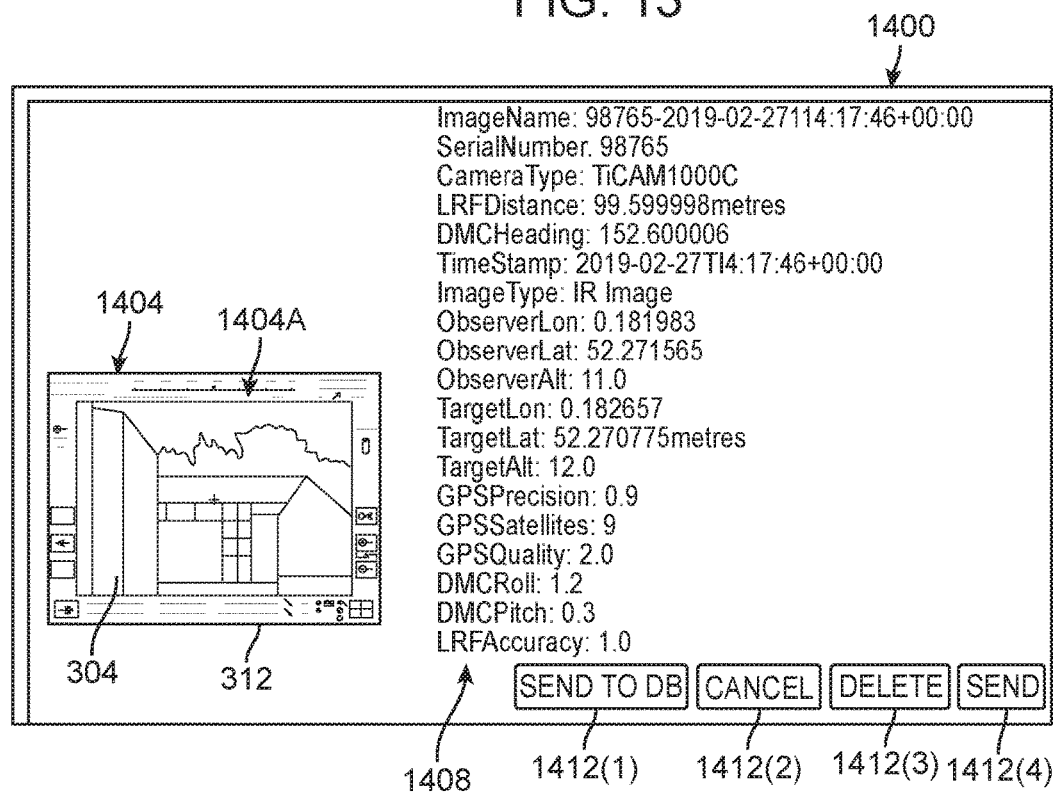
FIG. 14 is screenshot of an example popup target-details window illustrating details of a selected target and user-options for the selected target.

As seen in the example of FIG. 14, the target-details window 1400 includes a screenshot 1404 of the viewfinder display of the handheld imaging device 200 (FIG. 11), including an image, here a thermal image 1404A in the image-display region 304 (FIG. 3) and the information-display region 312 (FIG. 3) that surrounds the image-display region. The target-detail window 1404 also includes information 1408 regarding the target, as well as a number of soft buttons, here a "SEND TO DB" button 1412(1), a "CANCEL" button 1412(2), a "DELETE" button 1412(3), and a "SEND" button 1412(4). In this example, the "SEND TO DB" button 1412(1), the "CANCEL" button 1412(2), the "DELETE" button 1412(3), and the "SEND" button 1412(4). Other soft buttons may be used and/or substituted for the soft buttons 1412(1) to 1412(4).

Figure 15:
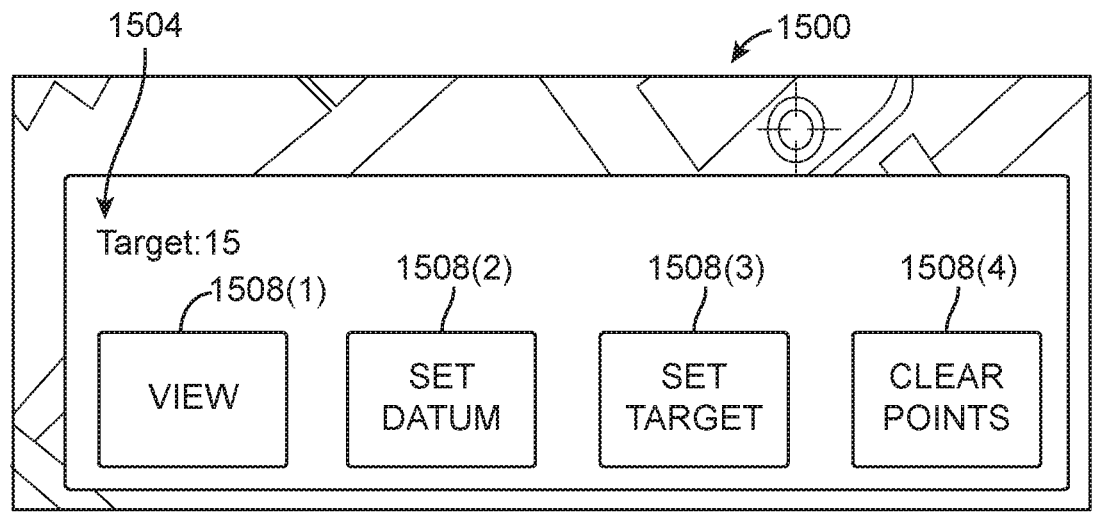
FIG. 15 is a screenshot of an example popup target-options window that allows a user to select among various options for the selected target and/or other targets previous selected for relative-location calculations.

Referring to any one of FIGS. 12, 13, and 15, when the user selects any one of the targets displayed on the map 1200, for example, by a gesture on a touchscreen or by moving a cursor so as to hover over the target, the GUI may be configured to open a popup target-options window 1500, an example of which is shown in FIG. 15. Referring to FIG. 15, in this example, the target-options window 1500 includes a target identifier 1504 that identifies the currently selected target, along with a set of soft buttons, here, a "VIEW" button 1508(1), a "SET DATUM" button 1508(2), a "SET TARGET" button 1508(3), and a "CLEAR POINTS" button 1508(4). In this example, the "VIEW" button 1508(1) opens a target-details window for the currently selected target, such as the target-details window 1400 of FIG. 14, the "SET DATUM" button 1508(2) allows the user to select and set (and optionally de-select) the currently selected target as the datum target for use in relative-location calculations, the "SET TARGET" button 1508(3) allows the user to select and set (and optionally de-select) the currently selected target as a relative-location target, and the "CLEAR POINTS" button 1508(4) allows a user to clear all of the previously set datum and previously set relative-location target(s), if any.

Figure 16:
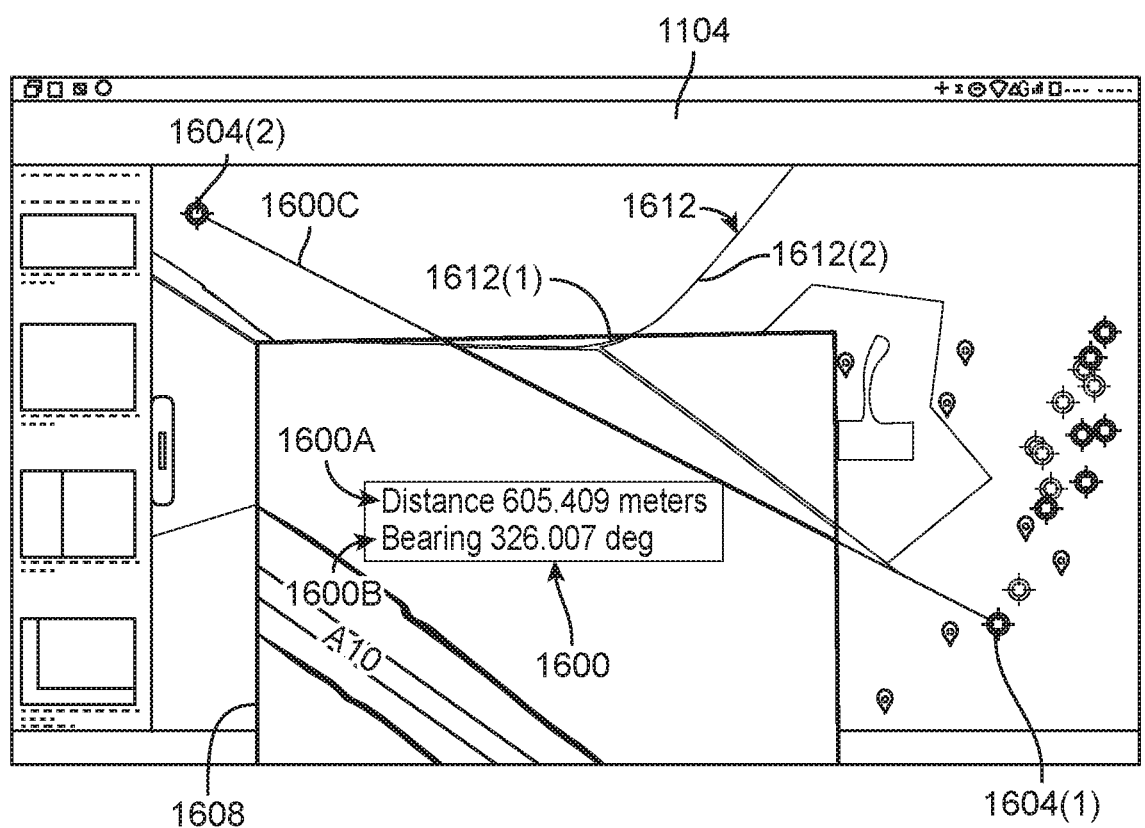
FIG. 16 is a screenshot of the example GUI of FIG. 12 showing the map displaying relative-location information for the relative location of a relative-location target to a datum target.

In some embodiments, once the user has selected a datum target and a relative-location target, for example, via the SET DATUM button 1508(2) and the SET TARGET button 1508(3), respectively, the pertinent device, such as either the handheld imaging device 200 or the external device, such as any one of external devices 1100(1) to 1100(3) of FIG. 11, may automatically calculate the relative location of the selected relative-location target to the selected datum and display the resulting relative-location information on the map 1200 (FIGS. 12, 13, and 15). FIG. 16 illustrates an example of the GUI 1104 displaying relative-location information 1600 for a selected datum target 1604(1) and a selected relative-location target 1604(2). In this example, the relative-location information 1600 includes a distance 1600A from datum target 1604(1) to relative-location target 1604(2) and a bearing 1600B relative to the datum target, as well as a direction-indicting arrow 1600C extending from the datum target to the relative- location target, with an arrowhead indicating the directionality from the datum target to the relative-location target. The GUI 1104 may be configured to display other information, such as information conveying the relative elevation of the relative-location target 1604(2) to the datum target 1604(1), such as a difference in elevation (e.g., a "+" value (relative-location target higher than the datum target), a "−" value (relative-location target lower than the datum target), or a null value (relative-location target at the same elevation as the datum target)) and/or an inclination or declination angle along with an appropriate corresponding inclination or declination indicator, such as a plus or minus sign and/or an upwardly or downwardly pointing arrow, or both, among others. FIG. 16 also illustrates an optional magnifier window 1608, which allows the user to magnify a region of the map 1200. In FIG. 16, the level of magnification illustrated can be seen by comparing the magnified portion 1612(1) of the road 1612 to the non-magnified portion 1612(2) of the same road. Some embodiments may allow for zoom-in and zoom-out functionality, such as via conventional pinch and expand gestures in touchscreen embodiments.

In some embodiments, particularly embodiments involving a handheld imaging device, such as handheld imaging device 200, the operation of functionalities of the mapping system 148, such as the functionalities described relative to FIGS. 11 to 16, may be independent of other modes, such as a target-acquisition mode and a triangulation mode, such as the modes described above in connection with the handheld imaging device 200. For example, once targets have been acquired and loaded into or otherwise available to the mapping system 148 (FIG. 1), any of such targets can be designated as either a datum target or a relative-location target, such as using the target-options window 1500 (FIG. 15). When the datum target and one or more relative locations targets have been identified for relative-location calculations, for example once a user has selected one or each type or after the user selects a "CALCULATE RELATIVE LOCATION(S)" button or similar user-actuated control, the mapping system 148 (FIG. 1) calculates relative-location values and displays at least some of the values, perhaps with other information, on the map 1200. In some embodiments, the mapping system 148 may aggregate acquired-target data from multiple sources, such as one or more instantiations of the handheld imaging device 200 (FIGS. 2A to 2C and 11) and/or other target-acquisition devices (not shown). It is noted that the other target-acquisition devices need not have the real-time triangulation mode and functionalities described above in connection with FIGS. 1 to 10. Rather, they only need the ability to acquire the target location information needed for the mapping system 148 to perform the necessary relative-location calculations.

Example Data Sharing

In addition or alternatively to providing data acquired by one or more imaging systems of the present disclosure, such as one or more instantiations of the handheld imaging device 200 of FIGS. 2A to 2C, with one or more external devices, such as external devices 1100(1) to 1100(3) of FIG. 11, two or more imaging systems may share data with one another. For example, two or more users (e.g., forward observers) may be located at different locations with corresponding respective instantiations of the handheld imaging device 200. In some scenarios, it may be beneficial for one or more of these users to know about one or more targets, or potential targets, acquired by one or more others of these users to assist in a particular mission.

Figure 17:
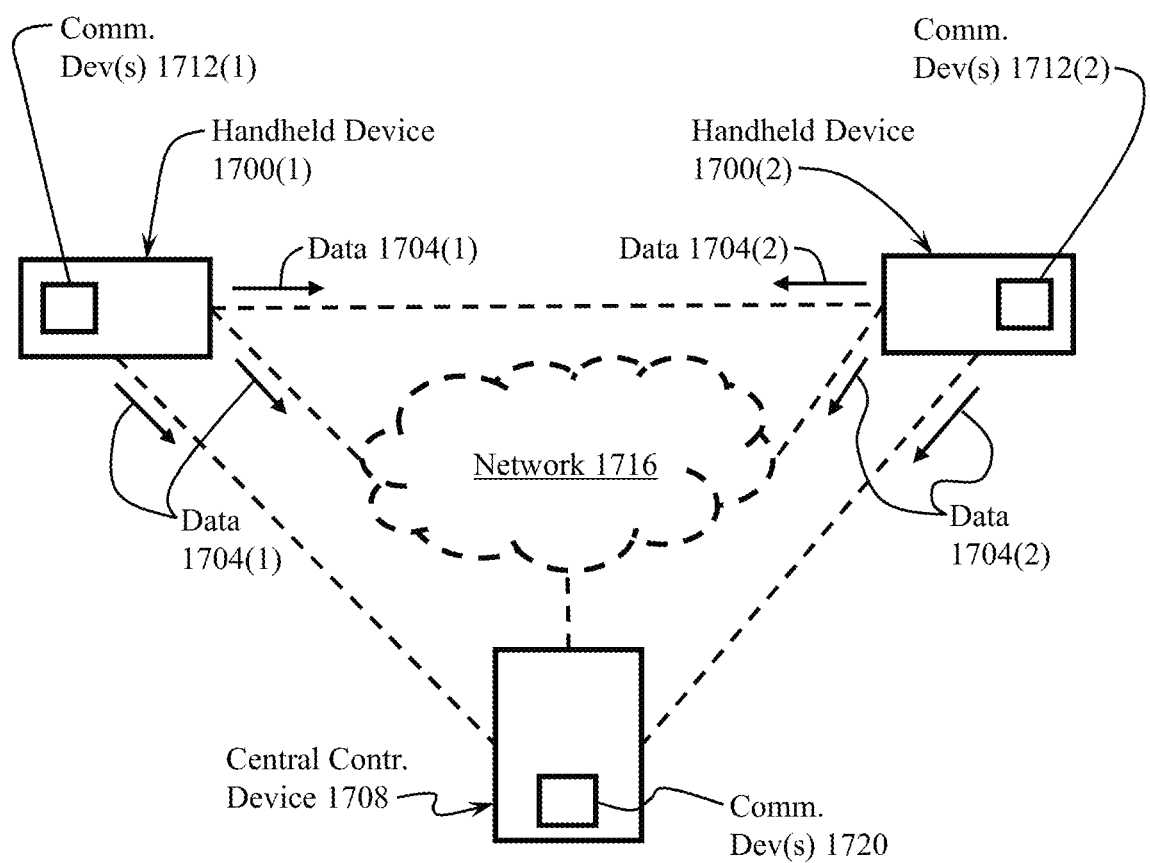
FIG. 17 is a high-level diagram of an example scenario in which acquired target data is shared among multiple devices.

FIG. 17 illustrates a scenario in which two handheld imaging devices 1700(1) and 1700(2) (sometimes also referred to below as "first" and "second", respectively) share data (represented, respectively, by arrows 1704(1) and 1704(2)) with a central controller device 1708 that allows a user (not shown) at the central controller device to view data from each of the handheld imaging devices, including the data 1704(1) and 1704(2). It is noted that each of the handheld imaging devices 1700(1) and 1700(2) may be the same as or similar to the handheld imaging device 200 of FIGS. 2A to 2C, and the central controller device 1708 may have the same or similar functionality as any of the external devices 1100(1) to 1100(3) described above in connection with FIG. 11. It is noted that while two handheld imaging devices 1700(1) and 1700(2) are illustrated in this example, the central controller device 1708 may communicate with more than two such devices. In some embodiments, the central controller device 1708 may share some or all of the data 1704(1) with the handheld imaging device 1700(2) and/or share some or all of the data 1704(2) with the handheld imaging device 1700(1). Examples of data 1704(1) and 1704(2) include, but are not limited to, target location data (absolute and/or relative to the corresponding handheld imaging device 1700(1) and 1700(2)), target identifiers, target images (e.g., visible light, thermal, and/or composite), handheld imaging device location data, triangulation data, handheld imaging device identification data, date and time data, handheld imaging device settings data, and mission identifier data, among others.

In some embodiments, each of the handheld imaging devices 1700(1) and 1700(2) may be outfitted with appropriate wireless communications system(s) 1712(1) and 1712(2), respectively, that allow them to communicate with one another, directly or over a suitable network 1716, to share the corresponding data 1704(1) and 1704(2). The various unlabeled dashed lines in FIG. 17 extending between devices and from a device to the network 1716 denote a communications pathway. Fewer than all of the communications pathways shown can be available in any particular instantiation. When communicating with the central controller device 1708, each wireless communications system 1712(1) and 1712(2) may communicate with one or more compatible communications systems 1720 onboard the central controller device. In this example, the network 1716 represents any one or more communications networks that enables the handheld imaging devices 1700(1) and 1700(2) to communicate with one another and/or with the central controller device 1708. Fundamentally, there is no limitation on the type(s) of communications network(s) that can be part of the network 1716. As noted above, the network 1716 may be replaced by direct communications between/among the handheld imaging devices 1700(1) and 1700(2) and/or the central controller device 1708.

In some embodiments, the data, such as data 1704(1) and/or 1704(2), shared by either one, or both, of the handheld imaging devices 1700(1) and 1700(2) and/or the central controller device 1708 may be limited to a particular class of data. For example, in some embodiments, data may be shared according to an assigned mission, and each device may share data specific to that mission with another device only if that other device is assigned to that mission. In an embodiment, the central controller device 1708 may be configured to create missions and assign other devices, such as one or both of the handheld imaging devices 1700(1) and 1700(2) to the missions as appropriate.

As one of many possible scenarios, the first and second handheld imaging devices 1700(1) and 1700(2), respectively, may be deployed with forward observers in two adjacent sectors of an active battle region, but both forward observers may both be able to see an overlapping region from their respective vantage points. In this case, a user of the central control device 1708 may assign three separate missions to the first and second handheld imaging devices 1700(1) and 1700(2), specifically, a first mission assigned only to the first handheld imaging device 1700(1) for identifying artillery targets outside of the overlapping region, a second mission assigned only to the second handheld imaging device 1700(2) for identifying artillery targets outside of the overlapping region, and a third mission assigned to both of the first and second handheld imaging devices for identifying targets in the overlapping region. In this case, the first handheld imaging device 1700(1) shares data for the first and third missions with the central controller device 1708, and the second handheld imaging device 1700(2) shares data for the second and third missions with the central control device. However, each of the first and second handheld imaging devices 1700(1) and 1700(2) will only receive data for the third, shared, mission, either from the central controller device 1708 or from one another if there is direction communications between the two handheld imaging devices. In other words, the central controller device 1708 will not share the first-mission data of the first handheld imaging device 1700(1) with the second handheld imaging device 1700(2) and will not share the second-mission data of the second handheld imaging device with the first handheld imaging device, nor will the first handheld imaging device share any first-mission data with the second handheld imaging device and nor will the second handheld imaging device share any second-mission data with the first handheld imaging device.

In one scenario, data to be shared with/between both the first and second handheld imaging devices 1700(1) and 1700(2) includes acquired target information. For example, the second handheld imaging device 1700(2) may acquire a most-recent fall-of-shot location as a new target but lose sight of a moving target being targeted by artillery. That moving target may become clearly seen with the first imaging device 1700(1), but the first imaging device may not have acquired the most-recent fall-of-shot location as a target. In this case, the second handheld imaging device 1700(2) can share the fall-of-shot acquired target with the first handheld imaging device 1700(1) directly or via the central controller device 1708. Once the first handheld imaging device 1700(1) receives the fall-of-shot target data, the corresponding forward observer can set the fall-of-shot target as a new datum target and then acquire the current location of the moving artillery target and cause the first handheld imaging device to calculate the relative position of the moving artillery target relative to the datum target (i.e., the fall-of-shot location) and provide that relative location to the central controller device 1708 or other external device so that a gunnery crew can adjust their aim. These operations can also be performed at the central controller device 1708, for example, using features discussed above relative to FIGS. 11 through 16. Many other scenarios are possible, as those skilled in the art will come to appreciate with a full understanding of the present disclosure. The central controller device 1108 may be configured to assign devices, such as handheld imaging device 1700(1) and 1700(2), to missions, or missions to devices, in any suitable manner. For example, the central controller device 1708 may display to the user an interactive list (not shown) of all of the devices connected to it, and the interactive list may allow the user to assign user-selected ones of the devices to one or more active missions. This may be accomplished, for example, by a drag and drop procedure or another suitable procedure. Alternatively and as alluded to above, the user may assign one or more devices to each active mission. This, too, may be accomplished, for example, by a drag and drop procedure or another suitable procedure.

In some aspects, the present disclosure is directed to a method of triangulating a relative location of a triangulation target to a datum target, the method comprising: setting the datum target, wherein the datum target has a spatial location; acquiring a spatial location of a target using a live-view imaging system of an imaging system; causing the imaging system to use the target as the triangulation target; and causing the imaging system to calculate the relative position of the triangulation target relative to the datum target.

In one or more embodiments of the method, wherein causing the imaging system to use the target as the triangulation target and causing the imaging system to calculate the relative position of the triangulation target relative to the datum target are performed in real time in response to receiving a user input.

In one or more embodiments of the method, wherein receiving a user input places the imaging system into a triangulation mode.

In one or more embodiments of the method, wherein setting the datum target includes selecting the datum target from a list of previously acquired targets.

In one or more embodiments of the method, wherein at least one of the previously acquired targets on the list was acquired by the imaging system.

In one or more embodiments of the method, wherein the imaging system is embodied in a first device, and the spatial location of the datum was acquired by second device separate from the first device.

In one or more embodiments of the method, wherein setting the datum includes receiving a user input that switches the imaging system into a triangulation mode.

In one or more embodiments of the method, wherein receiving a user input that switches the imaging system into a triangulation mode causes the imaging system to replace a current datum target with a current triangulation target.

In one or more embodiments of the method, wherein receiving a user input that switches the imaging system into a triangulation mode from a target-acquisition mode in which the user acquired a new target sets the new target as a new triangulation target.

In one or more embodiments of the method, wherein the user input that switches the imaging system into a triangulation mode from a target-acquisition mode is the same as a user input that switches the imaging system into the target-acquisition mode from the triangulation mode.

In one or more embodiments of the method, wherein the user input is a press of one or more buttons of a human-machine interface of the imaging system.

In one or more embodiments of the method, wherein receiving a user input that switches the imaging system into a triangulation mode from a target-acquisition mode in which the user has not acquired a new target causes the imaging system to replace the current datum target with the current triangulation target.

In one or more embodiments of the method, wherein receiving a user input that switches the imaging system into a triangulation mode from a target-acquisition mode in which the user has acquired a new target does not cause the imaging system to replace the current datum target.

In one or more embodiments of the method, wherein the user input that switches the imaging system into a triangulation mode from a target-acquisition mode is the same as a user input that switches the imaging system into the target-acquisition mode from the triangulation mode.

In one or more embodiments of the method, wherein the user input is a press of one or more buttons simultaneously with one another of a human-machine interface of the imaging system.

In one or more embodiments of the method, wherein the user replaces the current datum target by twice pressing the one or more buttons simultaneously with one another.

In one or more embodiments of the method, further comprising sequentially acquiring location information for a first new target; and causing the imaging system to execute an estimated-speed speed algorithm to calculate an estimated speed of the first new target based on the sequentially acquired location information.

In one or more embodiments of the method, further comprising acquiring location information for a second new target; and causing the imaging system to execute an estimated-time-of-arrival (ETA) algorithm to calculate an ETA of the first new target at the second new target based on the estimated speed of the first new target and the location information for the second new target.

In some aspects, the present disclosure is directed to a method of estimating a speed of a first target, the method comprising sequentially acquiring location information for the first target using a target-acquisition system onboard a handheld imaging device; and causing the handheld imaging device to execute an estimated-speed algorithm onboard the handheld imaging device to calculate an estimated speed of the first target based on the sequentially acquired location information.

In one or more embodiments of the method, further comprising acquiring location information for a second target using the target-acquisition system; and causing the imaging system to execute an estimated-time-of-arrival (ETA) algorithm to calculate an ETA of the first target at the second target based on the estimated speed and the location information for the second target.

In some aspects, the present disclosure is directed to a central controller device, comprising an electronic display; at least one microprocessor; a communications system operatively configured to communicate with one or more external devices and in operative communication with the at least one microprocessor; a memory in operative communication with the at least one microprocessor, the memory containing machine-executable instructions that, when executed by the at least one microprocessor: display on the display a graphical user interface (GUI) that displays a map and a plurality of targets acquired by at least one of the one or more external devices; allow the user to select one of the targets as a datum target; allow the user to select one of the targets as a triangulation target; calculates a difference between the spatial locations of the datum target and the triangulation target; and display the difference on the electronic display via the GUI.

In one or more embodiments of the central controller device, wherein, when executed by the at least one microprocessor, the machine-executable instructions allow the user to define a mission and assign at least one of the external devices to the mission or assign the mission to at least one of the external devices.

In one or more embodiments of the central controller device, wherein, when executed by the at least one microprocessor, the machine-executable instructions cause the central controller device to constrain sharing of data based on whether or not an external device is assigned to the mission or the mission is assigned to the external device.

In one or more embodiments of the central controller device, wherein, when executed by the at least one microprocessor, the machine-executable instructions: allow the user to select a target displayed on the GUI; and upon the user-selection of the target, display on the electronic display a tool that allows the user to set the target as a datum target or a triangulation target.

In one or more embodiments of the central controller device, wherein, when the tool comprises a popup window activated in response to the user-selection.

In some aspects, the present disclosure is directed to a machine-readable medium containing the machine-executable instructions of any one of the central controller devices recited herein.

In some aspects, the present disclosure is directed to a machine-readable medium containing machine-executable instructions for performing some or all functions of any one of the systems recited herein.

In some aspects, the present disclosure is directed to a machine-readable medium containing machine-executable instructions for performing any one of the methods recited herein.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system, comprising:
an imaging system that includes:
a live-view imaging system configured to display a live-view image of a scene to a user;
a target-acquisition system configured so that the user can acquire a spatial location of a first target in the scene while viewing the live-view image;
a triangulation system configured to:
allow the user to make the first target a triangulation target;
allow the user to identify a datum target having a spatial location; and
calculate a difference between the spatial locations of the datum target and the triangulation target; and
a display system configured to display the difference in real time,
wherein the triangulation system is configured so that the user identifies the datum target by selecting the datum target from a list of targets.

2. The system of claim 1, further comprising a target-acquisition mode and a triangulation mode and configured so that the user makes the first target the triangulation target by causing the imaging system to switch from the target-acquisition mode to the triangulation mode.

3. A system, comprising,
an imaging system that includes:
a live-view imaging system configured to display a live-view image of a scene to a user,
a target-acquistion system configured so that the user can acquire a spatial location of a first target in the scene while viewing the live-view image;
a triangulation system configured to:
allow the user to make the first target a triangulation target;
allow the user to identify a datum target having a spatial location, and
calculate a difference between the spatial locations of the datum target and the triangulation target, and
a display system configured to display the difference in real time;
wherein the imaging system is embodied in a first device and the imaging system receives the datum target from a second device separate from the first device.

4. The system of claim 3, wherein the triangulation system is configured so that the user identifies the datum target by selecting the datum target from a list of targets.

5. A system, comprising:
an imaging system that includes:
a live-view imaging system configured to display a live-view image of a scene to a user,
a target-acquistion system configured so that the user can acquire a spatial location of a first target in the scene while viewing the live-view image;

a triangulation system configured to:
   allow the user to make the first target a triangulation target,
   allow the user to identify a datum target having a spatial location; and
   calculate a difference between the spatial locations of the datum target and the triangulation target; and
a display system configured to display the difference in real time;
further comprising a target-acquisition mode and a triangulation mode and configured so that each time the user switches from the target-acquisition mode to the triangulation mode after acquiring a new target in the target-acquisition mode, the imaging system replaces the datum target with the triangulation target and the triangulation target with the new target.

6. The system of claim 5, wherein the imaging system is a handheld imaging device containing each of the live-view imaging system, the target-acquisition system, the triangulation system, and the output device.

7. The system of claim 6, further comprising a human-machine interface (HMI) system that includes a plurality of user-actuatable controls, wherein each of the live-view imaging system, the target-acquisition system, and triangulation system is configured so as to be user controlled via the user-actuatable controls.

8. The system of claim 7, wherein the handheld imaging device includes a housing having an exterior, and the user-actuatable controls includes a plurality of buttons on the exterior of the housing.

9. The system of claim 8, wherein the target-acquisition system includes a range finder that fires when the user releases one of the buttons.

10. The system of claim 7, wherein the HMI system is configured so that the triangulation system is engaged in response to a first user-actuation of a first user-actuatable control of the plurality of user-actuatable controls, and, when the user engages the triangulation system by actuating the first user-actuated control, the triangulation system makes the first target the datum target.

11. The system of claim 10, wherein the HMI system is configured so that a second user-actuation o the first user-actuated control sequentially following the first user-actuation engages the target-acquisition system m allow the user to acquire the spatial coordinates of the first target.

12. The system of claim 11, wherein the handheld imaging device includes a housing having an exterior, and the first user-actuated control is a hard button on the exterior of the housing.

13. The system of claim 11, wherein the triangulation system is configured to calculate the difference between the spatial locations of the datum target and the triangulation target automatically after the target-acquisition system aquires the first target.

14. A system, comprising:
an imaging system that includes:
   a live-view imaging system configured to display a live-view image of a scene to a user,
   a target-acquistion system configured so that the user can acquire a spatial location of a first target in the scene while viewing the live-view image;
   a triangulation system configured to:
      allow the user to make the first target a triangulation target,
      allow the user to identify a datum target having a spatial location; and
      calculate a difference between the spatial locations of the datum target and the triangulation target; and
   a display system configured to display the difference in real time;
further comprising a target-acquisition mode and a triangulation mode and configured so that each time the user switches from the target-acquisition mode to the triangulation mode, the imaging system does not change the datum target and replaces the triangulation target with the new target.

15. The system of claim 14, configured so that when the user switches from the triangulation mode to the target-acquisition mode and back to the triangulation mode without acquiring a new target while in the target-acquisition mode, the imaging system replaces the datum target with the triangulation target.

16. The system of claim 15, further comprising a human-machine interface (HMI) that includes at least one button that the user presses to switch between the target-acquisition mode and the triangulation mode, wherein, when the imaging system is in the triangulation mode, the user presses the at least one button twice to replace the datum target with the triangulation target.

17. A system, comprising:
an imaging system that includes:
   a live-view imaging system configured to display a live-view image of a scene to a user,
   a target-acquistion system configured so that the user can acquire a spatial location of a first target in the scene while viewing the live-view image;
   a triangulation system configured to:
      allow the user to make the first target a triangulation target,
      allow the user to identify a datum target having a spatial location; and
      calculate a difference between the spatial locations of the datum target and the triangulation target; and
   a display system configured to display the difference in real time;
further comprising memory that contains an estimated-speed algorithm, wherein the imaging system is configured so that the user can sequentially acquire location information for a first new target and cause the imaging system to execute the estimated-speed algorithm so as to determine an estimated speed based on the sequentially acquired location information.

18. The system of claim 17, wherein the memory further comprises an estimated-time-of-arrival (ETA) algorithm, wherein the imaging system is configured so that the user can acquire a second new target, separate from the first new target, and cause the imaging system to execute the ETA algorithm so as to estimate a time of arrival of the first new target at the second new target based on the location information for the second new target and the estimated speed of the first new target.

19. A system, comprising:
an imaging system that includes:
   a live-view imaging system configured to display a live-view image of a scene to a user,
   a target-acquistion system configured so that the user can acquire a spatial location of a first target in the scene while viewing the live-view image;
   a triangulation system configured to:
      allow the user to make the first target a triangulation target,
      allow the user to identify a datum target having a spatial location; and calculate a difference between the spatial locations of the datum target and the triangulation target; and a display system configured to display the difference in real time;

wherein the imaging system is a handheld imaging device containing each of the live-view imaging system, the target-acquistion system, the triangulation system, and the output device; and wherein the live-view image is switchable between at least two image types in a group consisting of a visible-light image, a thermal image, a clear-optical image, and a composite image comprising any two or more of the visible-light image, the thermal image, and the clear optical image.

20. The system of claim 19, wherein the live-view imaging system is configured to allow the user to switch among the image types while the user is controlling the triangulation system to acquire the spatial location of the second target.

21. A system, comprising:

an imaging system that includes:

a live-view imaging system configured to display a live-view image of a scene to a user, a target-acquistion system configured so that the user can acquire a spatial location of a first target in the scene while viewing the live-view image;

a triangulation system configured to:

allow the user to make the first target a triangulation target, allow the user to identify a datum target having a spatial location; and calculate a difference between the spatial locations of the datum target and the triangulation target; and a display system configured to display the difference in real time;

wherein the imaging system is a handheld imaging device containing each of the live-view imaging system, the target-acquistion system, the triangulation system, and the output device;

wherein the system further comprises a human-machine interface (HMI) system that includes a plurality of user-actuatable controls, wherein each of the live-view imaging system, the target-acquistion system, and triangulation system is configured so as to be user controlled via the user-actuatable controls;

wherein the HMI system is configured so that the triangulation system is engaged in response to a first user-actuation of a first user-actuatable control of the plurality of user-actuatable controls, and, when the user engages the triangulation system by actuating the first user-actuated control, the triangulation system makes the first target the datum target;

wherein the HMI system is configured so that a second user-actuation of the first user-actuated control sequentially following the first user-actuation engages the target-acquisition system to allow the user to acquire the spatial coordinates of the first target;

wherein the triangulation system is configured to calculate the difference between the spatial locations of the datum target and the triangulation target automatically after the target-acquisition system acquires the first target, and wherein the HMI system is configured so that a third user-actuation of the first user-actuated control sequentially following the second user-actuation causes the triangulation system to use the first target as the datum target.

22. A system, comprising:

an imaging system that includes:

a live-view imaging system configured to display a live-view image of a scene to a user, a target-acquistion system configured so that the user can acquire a spatial location of a first target in the scene while viewing the live-view image;

a triangulation system configured to:

allow the user to make the first target a triangulation target, allow the user to identify a datum target having a spatial location; and calculate a difference between the spatial locations of the datum target and the triangulation target; and a display system configured to display the difference in real time;

wherein the imaging system includes a visual display system that comprises a visual display having a live-view-image region that displays the live view image, wherein the live-view-image region includes a reticle that provides an aiming sight for the target-acquisition system.

23. The system of claim 22, further comprising a human-machine interface (HMI) system configured to display a visual indicator proximate to the reticle that indicates that the triangulation system is engaged.

24. A system, comprising:

an imaging system that includes:

a live-view imaging system configured to display a live-view image of a scene to a user, a target-acquistion system configured so that the user can acquire a spatial location of a first target in the scene while viewing the live-view image;

a triangulation system configured to:

allow the user to make the first target a triangulation target, allow the user to identify a datum target having a spatial location; and calculate a difference between the spatial locations of the datum target and the triangulation target; and a display system configured to display the difference in real time;

wherein the imaging system is a handheld imaging device containing each of the live-view imaging system, the target-acquisiton system, the triangulation system, and the output device; and wherein the imaging system is a handheld imaging device containing each of the live-view imaging system, the target-acquistion system, the triangulation system, and the output device; and wherein the imaging system includes a visual display system comprising a visual display having a live-view-image region and an information-display region, the live-view-image region provided to display the live-view image, and the information-display region provided to display spatial location data for each of the first, triangulation, and datum targets.

25. The system of claim 24, wherein the information-display region provides a visual indication that the spatial location of the datum target is a datum for triangulation calculations.

26. The system of claim 24, wherein the information-display region is configured to display the spatial location of the datum target, the spatial location of the triangulation target, and the difference between the spatial locations of the triangulation target and the datum target.

27. The system of claim 26, wherein the information display region is configured to display the spatial location of the triangulation target on a first line, the spatial location of the datum target on a second line, and the difference between the spatial locations of the triangulation target and the datum target on a third line.

28. A system, comprising:
an imaging system that includes:
a live-view imaging system configured to display a live-view image of a scene to a user,
a target-acquistion system configured so that the user can acquire a spatial location of a first target in the scene while viewing the live-view image;
a triangulation system configured to:
allow the user to make the first target a triangulation target,
allow the user to identify a datum target having a spatial location; and
calculate a difference between the spatial locations of the datum target and the triangulation target; and
a display system configured to display the difference in real time;
further comprising an external device and a mapping system, wherein the mapping system is configured to display the spatial locations of the triangulation and datum targets on a map on an electronic display of the external device.

29. The system of claim 28, wherein the mapping system includes a graphical user interface (GUI) configured to allow a user to set the datum target and to set one or more other targets as the triangulation target.

30. The system of claim 29, wherein the mapping system calculates the relative location of the triangulation target to the datum target and displays corresponding relative-location information on the map.

31. The system of claim 30, wherein the GUI displays a target-options window in response to a user selecting a desired target.

32. The system of claim 31, wherein the target-options window includes an option that allows the user to set the desired target as the datum target or as the triangulation target at the choosing of the user.

33. A system, comprising:
an imaging system that includes:
a live-view imaging system configured to display a live-view image of a scene to a user,
a target-acquistion system configured so that the user can acquire a spatial location of a first target in the scene while viewing the live-view image;
a triangulation system configured to:
allow the user to make the first target a triangulation target,
allow the user to identify a datum target having a spatial location; and
calculate a difference between the spatial locations of the datum target and the triangulation target; and
a display system configured to display the difference in real time;
the system further comprising:
a central controller device that includes:
an electronic display;
at least one microprocessor;
a communications system operatively configured to communicate with one or more external devices and in operative communication with the at least one microprocessor;
a memory in operative communication with the at least one microprocessor, the memory containing machine-executable instructions that, when executed by the at least one microprocessor:
display on the display a graphical user interface (GUI) that displays a map and a plurality of targets acquired by at least one of the one or more external devices;
allow the user to select one of the targets as a datum target;
allow the user to select one of the targets as a triangulation target;
calculates a difference between the spatial locations of the datum target and the triangulation target; and
display the difference on the electronic display via the GUI.

34. The system of claim 33, wherein, when executed by the at least one microprocessor, the machine-executable instructions allow the user to define a mission and assign at least one of the external devices to the mission or assign the mission to at least one of the external devices.

35. The system of claim 34, wherein, when executed by the at least one microprocessor, the machine-executable instructions cause the central controller device to constrain sharing of data based on whether or not an external device is assigned to the mission or the mission is assigned to the external device.

36. The system of claim 34, wherein, when executed by the at least one microprocessor, the machine-executable instructions:
allow the user to select a target displayed on the GUI; and
upon the user-selection of the target, display on the electronic display a tool that allows the user to set the target as a datum target or a triangulation target.

37. The system of claim 36, wherein, when the tool comprises a popup window activated in response to the user-selection.

* * * * *

UNITED STATES PATENT AND TRADEMARK OFFICE
CERTIFICATE OF CORRECTION

PATENT NO. : 11,455,742 B2
APPLICATION NO. : 16/850137
DATED : September 27, 2022
INVENTOR(S) : Richard Sydney Salisbury et al.

It is certified that error appears in the above-identified patent and that said Letters Patent is hereby corrected as shown below:

In the Claims

In Column 30, Line 30, Claim 1, the "," following the word "time" should be replaced with a ";".
In Column 30, Line 39, Claim 3, the "," following the word "comprising" should be replaced with a ":".
In Column 30, Line 43, Claim 3, the words "target-acquistion" should be replaced with "target-acquisition".
In Column 31, Line 43, Claim 11, the letter "o" should be replaced with the word "of".
In Column 31, Line 45, Claim 11, the letter "m" should be replaced with the word "to".
In Column 31, Line 55, Claim 13, the word "aquires" should be replaced with "acquires".
In Column 31, Line 60, Claim 14, the words "target-acquistion" should be replaced with "target-acquisition".
In Column 32, Line 28, Claim 17, the words "target-acquistion" should be replaced with "target-acquisition".
In Column 32, Line 60, Claim 19, the words "target-acquistion" should be replaced with "target-acquisition".
In Column 33, Line 7, Claim 19, the words "target-acquistion" should be replaced with "target-acquisition".
In Column 33, Line 23, Claim 21, the "," following the word "user" should be replaced with a ";".
In Column 33, Line 24, Claim 21, the words "target-acquistion" should be replaced with "target-acquisition".
In Column 33, Line 38, Claim 21, the words "target-acquistion" should be replaced with "target-acquisition".
In Column 33, Line 43, Claim 21, the words "target-acquistion" should be replaced with "target-acquisition".
In Column 34, Line 4, Claim 22, the "," following the word "user" should be replaced with a ";".
In Column 34, Line 5, Claim 22, the words "target-acquistion" should be replaced with "target-acquisition".
In Column 34, Line 32, Claim 24, the words "target-acquistion" should be replaced with "target-acquisition".

Signed and Sealed this
Eighth Day of November, 2022

Katherine Kelly Vidal
*Director of the United States Patent and Trademark Office*

In Column 34, Line 46, Claim 24, the words "target-acquisiton" should be replaced with "target-acquisition".
In Column 34, Line 50, Claim 24, the words "target-acquistion" should be replaced with "target-acquisition".
In Column 35, Line 11, Claim 28, the words "target-acquistion" should be replaced with "target-acquisition".
In Column 35, Line 47, Claim 33, the words "target-acquistion" should be replaced with "target-acquisition".